United States Patent
Deach

(10) Patent No.: US 9,536,279 B2
(45) Date of Patent: Jan. 3, 2017

(54) METHOD AND APPARATUS FOR CREATING A GRAPHICS DATA REPRESENTATION AND SCALING A GRAPHIC REPRESENTED THEREBY

(71) Applicant: MOTOROLA MOBILITY LLC, Libertyville, IL (US)

(72) Inventor: Stephen A. Deach, Fremont, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/869,040

(22) Filed: Apr. 24, 2013

(65) Prior Publication Data

US 2014/0320540 A1 Oct. 30, 2014
US 2016/0225123 A9 Aug. 4, 2016

Related U.S. Application Data

(60) Provisional application No. 61/776,134, filed on Mar. 11, 2013.

(51) Int. Cl.
*G09G 5/00* (2006.01)
*G06T 3/40* (2006.01)
*G06T 11/20* (2006.01)

(52) U.S. Cl.
CPC ............... *G06T 3/40* (2013.01); *G06T 3/4007* (2013.01); *G06T 11/203* (2013.01)

(58) Field of Classification Search
USPC ........................................................ 345/619
See application file for complete search history.

(56) References Cited

U.S. PATENT DOCUMENTS 4,675,830 A 6/1987 Hawkins
4,785,391 A 11/1988 Apley et al.
(Continued)

FOREIGN PATENT DOCUMENTS

EP 1643449 A2 4/2006

OTHER PUBLICATIONS

Zack Rusin: Resolution independence for icons, http://zrusin.blogspot.com/2006/11/resolution-independence-for-icons.html, Wednesday, Nov. 22, 2006, all pages.
(Continued)

*Primary Examiner* — M Good Johnson
(74) *Attorney, Agent, or Firm* — Morris & Kamlay LLP

(57) ABSTRACT

A processor is operable to generate a graphics data representation (GDR) for a graphic created at a first resolution and including two or more separated objects. The processor decomposes the objects into contours and determines features and control points along the contours. Additionally, the processor determines constraints for imposition upon the features and control points during scaling, where the constraints include spatial relationships between the control points. The processor stores the constraints, identifications of the features and control points, contour descriptions, and information identifying the first resolution to produce the GDR. Upon acquiring the GDR, a displaying device's processor determines a scaling value based on the first resolution and a second resolution at which the graphic will be displayed, adjusts features and control points of the contours based on the scaling value and the GDR constraints to produce a scaled graphic, and displays the scaled graphic at the second resolution.

32 Claims, 11 Drawing Sheets

(56) References Cited

U.S. PATENT DOCUMENTS

| | | | |
|---|---|---|---|
| 5,099,435 | A | 3/1992 | Collins et al. |
| 5,155,805 | A | 10/1992 | Kaasila |
| 5,159,668 | A | 10/1992 | Kaasila |
| 5,325,479 | A | 6/1994 | Kaasila |
| 5,583,978 | A | 12/1996 | Collins et al. |
| 5,664,086 | A | 9/1997 | Brock et al. |
| 5,949,435 | A | 9/1999 | Brock et al. |
| 6,600,490 | B1 | 7/2003 | Brock et al. |
| 7,152,211 | B1 | 12/2006 | Fernandez et al. |
| 2003/0052875 | A1* | 3/2003 | Salomie .................. 345/419 |
| 2006/0290695 | A1* | 12/2006 | Salomie .................. 345/420 |

OTHER PUBLICATIONS

Seybold, Report on Desktop Publishing, Level 2 PostScript Highlights Showcase, vol. 6, No. 7, ISSN: 0889-9762, Mar. 9, 1992, all pages.

International Search Report and Written Opinion for PCT/US2014/015687 mailed Jun. 24, 2014.

Parker, "Scaling low-resolution bitmap fonts using linear feature extraction", ISR of PCT/US2014/015687.

Shainir, et al., "Extraction of Typographic Elements from Outline Represent at ions of Fonts", ISR of PCT/US2014/015687 dated Jun. 27, 2014.

https://partners.adobe.com/public/developer/en/font/T1_SPEC.PDF, retrieved on Oct. 29, 2015.

* cited by examiner

METHOD AND APPARATUS FOR CREATING A GRAPHICS DATA REPRESENTATION AND SCALING A GRAPHIC REPRESENTED THEREBY

FIELD OF THE INVENTION

The present invention relates generally to the generation and scaled display of graphics, such as icons, logos, symbols, and images, and, more particularly, to a method and apparatus for creating a graphics data representation and scaling a graphic represented thereby for display on a display screen.

BACKGROUND

Electronic products, such as laptop computers, tablet computers, smartphones, cellular phones, multimedia players, handheld gaming devices, and other devices, and software applications that run on them, typically use large numbers of bitmap images for displaying user interface (UI) icons, logos, symbols, images and other graphics. If a device is configured to support bitmap images at a variety of sizes or across a spectrum of device resolutions, then the bitmaps generally must be created and stored for each of the target sizes and device resolutions. For example, vector images of desired graphics are typically created and hand-tuned separately for each targeted resolution using a bitmap editing tool. In the Android graphics environment, hand-tuned bitmaps are typically created for every icon, every background (especially if non-rectangular, bordered, shaded, or textured), every button shape, and so forth at low density resolution (LDPI), medium density resolution (MDPI), high density resolution (HDPI), and extra high density resolution (XHDPI). Many of these icons are relatively simple shapes, having a handful of contours which would be under several hundred bytes when represented as vector-graphic objects, but their bitmap representations are several thousand bytes. As a result, use of multiple resolution-specific bitmaps for each graphic poses asset management issues in the display/production environment and storage issues on the device.

A more efficient use of device memory and processing resources could be achieved by creating and storing icons or other graphics as vector graphics and scaling them to the target resolution. However, conventional vector graphics scaling techniques often produce undesirable quality, especially where the scaling is between resolutions that do not have an integer relationship. As a result, many icons are initially created using a vector graphics design tool and are then manually converted to resolution-specific bitmaps and hand-tuned to achieve a desired quality for a target screen resolution.

To illustrate errors typically introduced through conventional vector graphics scaling, reference is made to FIG. 1, which illustrates non-integer, high-to-low resolution scaling of an exemplary graphic 101 in accordance with conventional graphics scaling techniques. More particularly, FIG. 1 illustrates conventional scaling between screen resolutions having a ratio of 1.33:1, such as would be the case when scaling from MDPI to LDPI or from XHDPI to HDPI. In such a case, the pixel grid of the target resolution does not align with the pixel grid of the source resolution.

As can be observed from FIG. 1, the exemplary graphic 101 includes a generally rectangular border 103 surrounding five progressive-height, common-width, equally-spaced bars 105-109. The exemplary graphic 101 may be used to visually indicate received signal strength for a wireless network to which the electronic device is connected. After scaling the graphic 101 according to conventional techniques, the scaled graphic 111 is distorted relative to the original graphic 101. For example, the rectangular border 113 of the scaled graphic 111 does not maintain the same thickness in proportion to the widths of the bars 115-119 of the scaled graphic 111. Additionally, the bars 115-119 of the scaled graphic 111 no longer have the same widths or equal spacing. As a result, while the scaled graphic 111 has the same general arrangement as the original graphic 101, the quality of the scaled graphic 111 is significantly degraded.

In the early 1990's, font developers recognized that additional processing was needed to display fonts on electronic displays and the 240-300 dots per inch (dpi) printers of that era. So, the developers created a specialized service, referred to as "font hinting," to improve the quality of fonts as displayed on the various displays and printers. According to font hinting, critical features and control points of font glyph contours are identified and pixel-grid-related positioning adjustments are made to the features and/or control points to improve the appearance of the contours when imaged or displayed on a target pixel grid. For example, positions of the control points of a font glyph are adjusted so that the font glyph is ideally registered to (aligned with) the pixel grid of the target display or printer. The pixel-grid adjustments are defined by constraints or rules applied to individual control points, sets of control points, and/or the relationships (e.g., distances) between two or more control points of a font glyph. The features, control points, and constraints for font glyphs of a particular font are embedded in the font formats and font engine for the font.

While font hinting provides high quality display scalability for fonts, it is insufficient for general graphics containing. Importantly, font hinting does not address shadows of multiple shapes/objects or relations of objects to one another (such as abutting or co-aligned portions of adjacent contours as opposed to relationships purely between control points within a single object as occurs in a font glyph). Additionally, font hinting does not address uniformity/progressions of spacing between two or more objects. Spatial relationships between font glyphs, such as in a displayed sentence, are handled by separate processes, such as kerning and justification, outside of the font format itself. Additionally, font hinting has been generally ignored by the graphics community, which maintains a belief that adjusting the outline of an object is unnecessary. Instead, the graphics industry relies upon anti-aliasing, gamma curve adjustments, and dithering to address scaling-related issues. Furthermore, because graphic authoring tools do not typically support intelligent scaling, graphic designers have not considered the algorithmic scaling of vector graphics to be adequate and, therefore, have deferred to creating individual bitmaps at targeted display resolutions.

Figure 1:
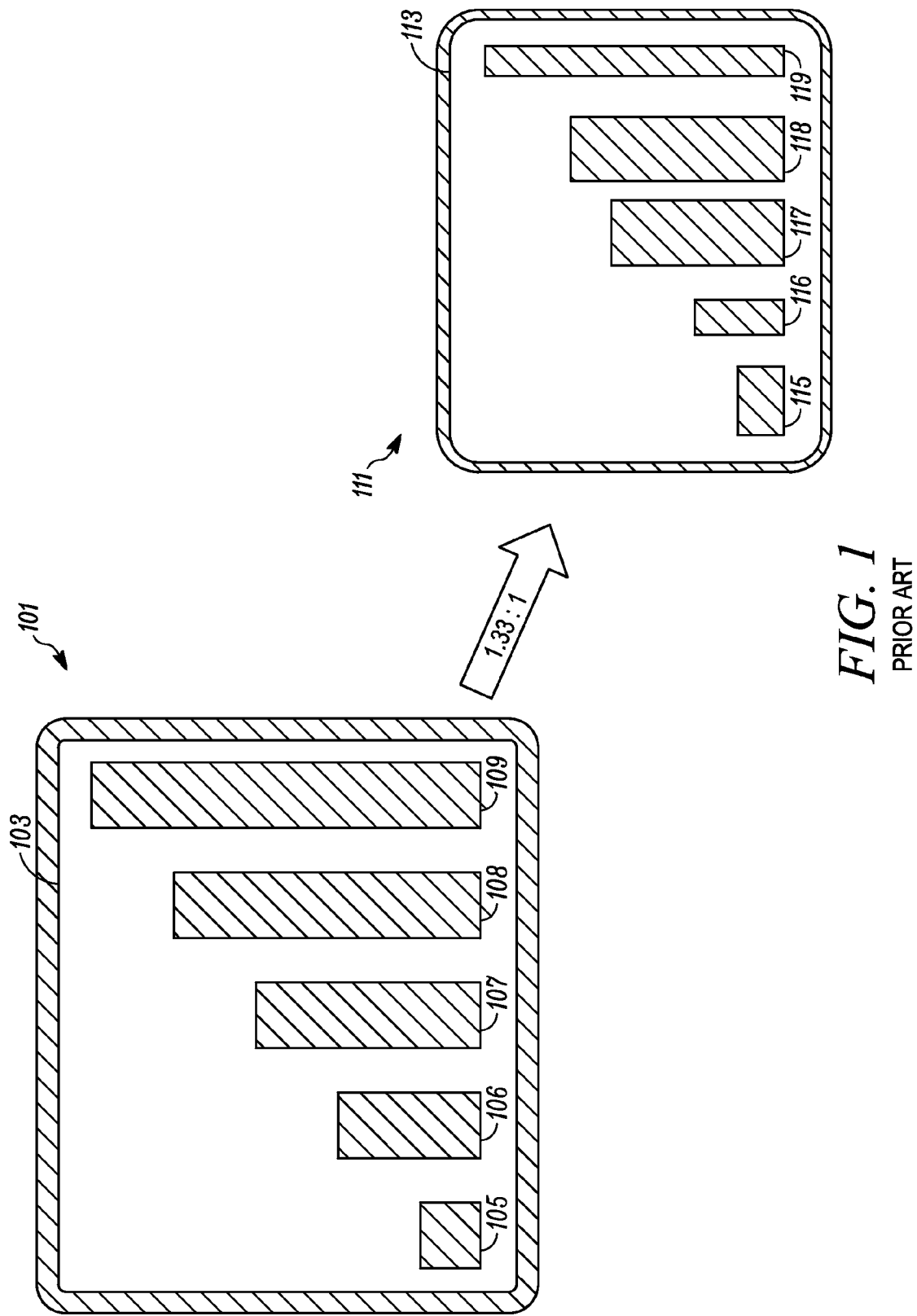
FIG. 1 illustrates non-integer, high-to-low resolution scaling of a graphic in accordance with prior art graphics scaling techniques.

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various exemplary embodiments of the present invention.

DETAILED DESCRIPTION

Generally, the present invention encompasses a method and apparatus for creating a graphics data representation and scaling a graphic represented thereby for display on a display screen of an electronic device. According to one embodiment, a processor operating in a computer or other electronic device executes a software program implementing a method for creating a graphics data representation (GDR) for a graphic that was created at a first resolution and includes a plurality of objects separated by one or more predefined spatial relationships. According to the method, the processor decomposes the objects of the graphic into a plurality of contours. The processor then determines features and control points along the contours. When the contours include at least one Bézier curve, the processor may also determine secondary points offset from the Bézier curve, where the secondary points provide additional reference positions to define the Bézier curve portion of the contour. The processor also determines constraints to be imposed upon the features, control points, and secondary points (when applicable) during any future scaling of the graphic, wherein the constraints include spatial relationships between control points and/or features of contours constituting at least part of two or more spaced apart objects. In an alternative embodiment, the processor may also determine constraints to be imposed upon the spatial relationships between control points and/or features of a single object. The processor then stores the constraints, identifications of the features, control points, and secondary points (when applicable), descriptions of the contours, and information identifying the resolution at which the graphic was created as the graphics data representation in a format understandable by a processor of an electronic device on which the graphic is to be displayed. A graphics data representation generated in the foregoing manner facilitates scaling of the represented graphic from the first resolution at which the graphic was created to a second resolution at which the graphic is to be displayed and is especially beneficial when the two resolutions have a non-integer relationship.

In alternative embodiments, the created graphics data representation may be included in an application executable by one or more processors of a displaying electronic device or may be communicated separately or as part of an application or other data file to the displaying electronic device over a network, such as the Internet, an intranet, a wireless network, or any other means for communicating between electronic devices. Alternatively or additionally, the constraints to be imposed upon the features and control points during scaling of the graphic may be prioritized during formation of the graphics data representation and/or may include intra-contour constraints and inter-contour constraints. In yet another alternative embodiment, two or more of the constraints may apply to a single control point. Further, the determined features of the contours may include one or more of: horizontal faces of lines, vertical faces of lines, angled faces of lines, parallel faces of lines, horizontal and vertical extremes of curves, inflection points of curves, junctions of lines and curves, junctions of lines of differing slopes, junctions of successive curves, centers of circles, centers of isolatable fragments of the contours, and center points of the contours.

In a further embodiment, the constraints to be imposed upon the features and control points during scaling of the graphic may include rules for aligning at least some of the features and the control points to full pixel boundaries of a display, mid-pixel boundaries of a display, or particular distances between full pixel boundaries of a display; rules for aligning at least some of the features so as to be particular distances from other features; rules for aligning at least some of the control points so as to be particular distances from other control points; rules for maintaining desired thicknesses of lines used to create one or more of the features; rules for maintaining a desired overall width of the graphic; rules for maintaining a desired midpoint between any two of the control points; and/or rules for maintaining a desired midpoint between any two of the features.

In yet another embodiment, the constraints to be imposed upon the features and control points during scaling of the graphic may include rules for simplifying the features and the objects based on a scaling value determinable from the resolution at which the graphic was created and the resolution at which the graphic is to be displayed. For example, but not by way of limitation, the constraints may include rules for collapsing a feature dimension to zero when the feature dimension must be adjusted to be less than a threshold quantity of pixels based on the scaling value. In such a case, the contour having the zeroed feature dimension would not be rendered on the display and would be treated as if it had been removed from the graphic. Additionally or alternatively, the constraints may include rules for removing features and control points along one or more of the contours based on the scaling value.

According to another embodiment of the present invention, a processor operating in a computer or other electronic device may execute a software program implementing a method for scaling a graphic for display on a display screen of the electronic device. The graphic includes two or more objects separated by one or more predefined spatial relationships and is represented by a graphics data representation. The graphics data representation includes information identifying a first resolution at which the graphic was created, descriptions of contours defining the objects of the graphic, identifications of features, control points, and optional secondary points along the contours, and constraints for imposition upon the features, the control points, and the optional secondary points during scaling of the contours. The constraints include spatial relationships between control points of two or more contours defining two or more spaced apart objects. According to this embodiment, the electronic device has previously stored the graphics data representation in memory of the device (e.g., as part of the device's operating system software or prestored applications or after receiving the graphics data representation (or an application or other data file that includes it) over a network or from a computer-readable storage medium). When the graphics data representation is included in an application, the processor may execute the application in order to retrieve the graphics data representation. Additionally, the processor performing the scaling may be the same processor that created the graphics data representation, another processor in a device in which the graphics data representation was created, or a processor in another device in which the graphics data representation is stored.

To scale the graphic in accordance with the scaling method, the processor determines a scaling value based on a relationship between the first resolution at which the graphic was created and a second resolution at which the graphic is to be displayed. The processor then adjusts the features and the control points of the contours based on the scaling value and the constraints in the graphics data representation to produce a scaled representation of the graphic. The processor displays the scaled representation of the graphic on a display screen of the electronic device at the second resolution. As noted above, the constraints forming part of the graphics data representation may include rules for simplifying the features and the objects based on the scaling value. Such rules may include rules for collapsing a feature dimension to zero when the feature dimension must be adjusted to be less than a threshold quantity of pixels based on the scaling value and/or rules for removing features and control points along one or more of the contours based on the scaling value. When the graphics data representation further includes identifications of secondary points for providing additional reference positions to define one or more Bézier curves, the processor may further adjust the secondary points based on adjustments made to control points for the Bézier curve(s). The control points for Bézier curves are typically the endpoints of the curves.

In a further embodiment, the present invention provides a graphics data representation for use by a processor of an electronic device to display a graphic on a display screen of the electronic device. The graphic includes two or more objects separated by one or more predefined spatial relationships. The graphics data representation may be a data structure or other data file stored in a computer-readable storage medium, such as volatile or non-volatile memory of the electronic device or a portable memory storage device. According to this embodiment, the graphics data representation includes descriptions of contours defining the objects of the graphic, identifications of features and control points along the contours, information identifying a first resolution at which the graphic was created, and constraints for imposition upon the features and the control points during scaling of the contours from the first resolution at which the graphic was created to a second resolution at which the graphic is to be displayed, wherein the constraints include spatial relationships between control points of two or more contours constituting at least part of two or more spaced apart objects. When the contours include one or more Bézier curves, the graphics data representation may additionally include identifications of secondary points offset from the Bézier curve(s), wherein the secondary points provide additional reference positions to define the Bézier curve(s). In a further embodiment, the graphics data representation may also include other information that would be necessary to render contours of the represented graphic on the display, such as solid fill color, color gradient specifications, and/or fill pattern.

In yet another embodiment, the present invention provides an electronic device that includes a display screen, a memory, and a processor. The processor is operably coupled to the display and the memory. According to this embodiment, the display screen is operable to display graphics at a first resolution. The memory is operable to store a graphics data representation for a graphic, which includes two or more objects separated by one or more predefined spatial relationships. The graphics data representation includes information identifying a second resolution at which the graphic was created, descriptions of contours defining the objects of the graphic, identifications of features and control points along the contours, and a group of constraints for imposition upon the features and the control points during scaling of the contours from the resolution at which the graphic was created to the resolution of the display screen. The constraints include spatial relationships between control points of two or more contours constituting at least part of two or more of the graphic's spaced apart objects. The processor of the electronic device is operable to determine a scaling value based upon a relationship between the resolution of the display screen and the resolution at which the graphic was created, adjust the features and the control points of the contours based on the scaling value and the constraints in the graphics data representation to produce a scaled representation of the graphic, and display the scaled representation of the graphic on the display screen. The display screen resolution may have an integer or non-integer relationship to the resolution at which the graphic was created, and the display screen resolution may be higher or lower than the resolution at which the graphic was created.

In an alternative embodiment of the electronic device, the device may further include a communications interface coupled to the processor. In such an embodiment, the communications interface may be operable to receive the graphics data representation over a network and the processor may be operable to store the received graphics data representation in the electronic device's memory. Additionally or alternatively, the graphics data representation may be included in an application stored in the electronic device's memory and/or received through the communications interface. In such a case, the processor may be further operable to execute the application to retrieve the graphics data representation.

In a further embodiment of the electronic device, the processor may be operable to create the graphics data representation or other graphics data representations. In accordance with this embodiment, the processor may be operable to decompose the objects of a graphic into multiple contours, determine features and control points along the contours, determine constraints to be imposed upon the features and control points during scaling, and store the constraints, identifications of the features and the control points, descriptions of the contours, and information identifying the resolution at which the graphic was created in the memory as a graphics data representation.

By creating graphics data representations that take into account features of graphics as well as spatial constraints between objects of the graphics, the present invention provides a means for enabling a displaying device to accurately scale a graphic represented by a graphics data representation to minimize distortion and improve image quality, especially where the resolution at which the graphic was created and the resolution of the display have a non-integer relationship. In this manner, the present invention enables scaled graphics to maintain original symmetry while minimizing blurring. Additionally, while the present invention may be used to create and scale all forms of graphics, the present invention is particularly beneficial for any graphic where curve quality, apparent sharpness, perceived symmetry, stroke uniformity or progressive stroke weights, and/or perceived spacing uniformity is important.

Embodiments of the present invention can be more readily understood with reference to FIGS. 2-11, in which like reference numerals designate like items. As used herein and in the appended claims, the term "contour" means a closed path that forms all or part of a shaped object of a graphic. Additionally, the term "control point" means a point on or along a contour, or associated with a contour. There may be one or more control points associated with each contour of a graphic. The term "electronic device" means any processor-based device that operates at least in part based on a set of operating instructions, such as a computer program. An electronic device may include a display screen for visually displaying one or more graphics. The term "face" means a substantially flat area of a contour that would render as flat at a potential target resolution, and may be vertical, horizontal, or angled at any slope. The term "feature" means an area of interest on or in a shaped object of a graphic for which the presence, pixel registration, and/or symmetry is important to the appearance or discernability of the object. The term "extremes of a curve" means any point on a curve that would be tangent to a horizontal or vertical line, such as the rightmost, leftmost, topmost, or bottommost point on a curve or circle. The term "graphic" means any object or combination of objects that provides a visual image when displayed on a display screen of an electronic device. A graphic, as used herein, may include text, but is not text alone. Thus, a graphic as used herein is not merely a font. The term "secondary points" means points offset from a contour and whose positions are adjusted indirectly as the result of adjustment to one or more control points. The term "constraints" means rule-based instructions governing repositioning of one or more control points and/or one or more features of a graphic during scaling of the graphic.

Figure 2:
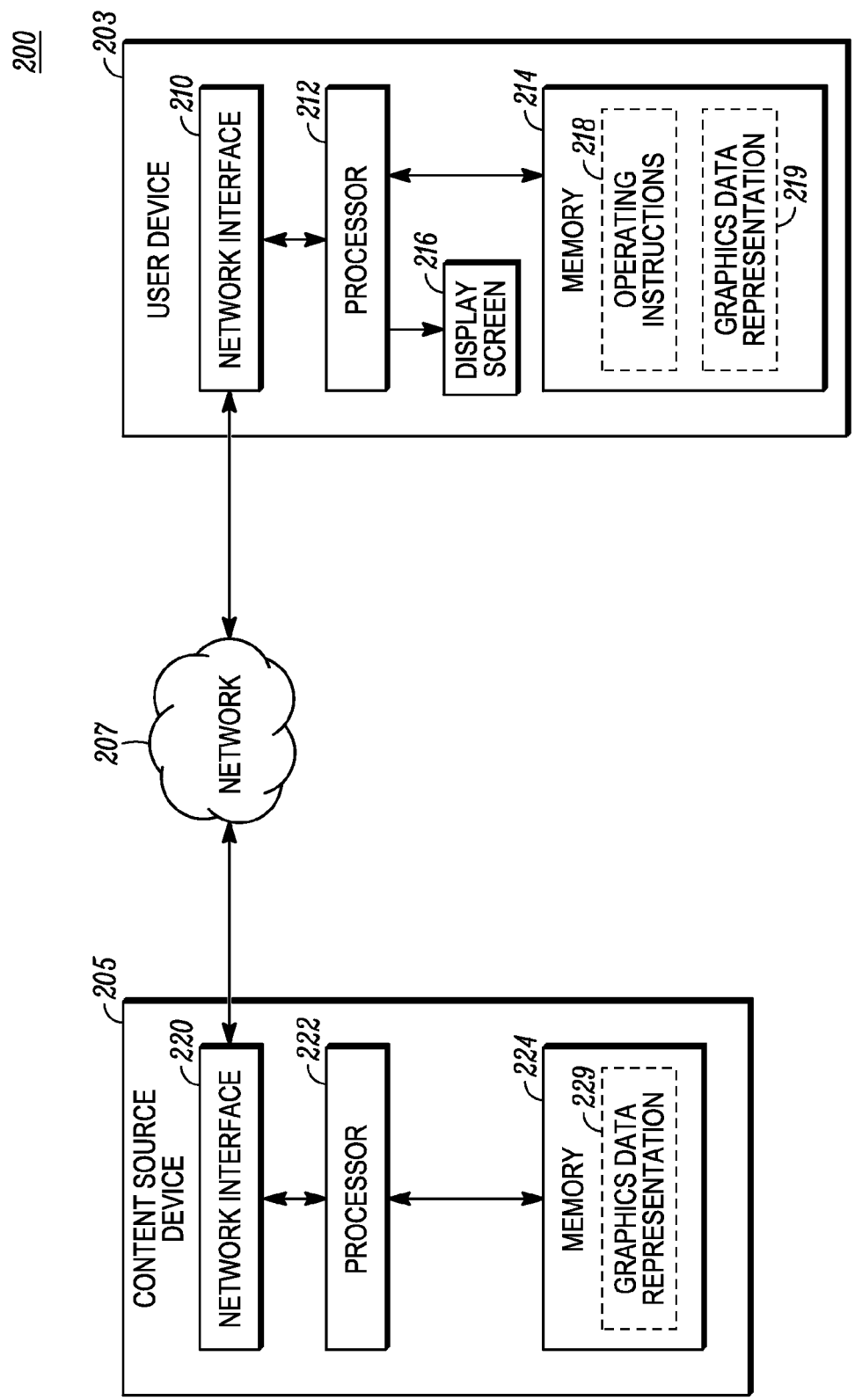
FIG. 2 is an electrical block diagram of a communication system for generating, distributing, and displaying graphics in accordance with one exemplary embodiment of the present invention.

FIG. 2 is an electrical block diagram of a communication system 200 for generating, distributing, and displaying graphics in accordance with one exemplary embodiment of the present invention. The exemplary communication system 200 includes one or more user devices 203 (one shown), one or more content source devices 205 (one shown), and a network 207 communicatively coupling the user devices 203 to the content source devices 205. Each user device 205 is an electronic device that includes, inter alia, one or more communication network interfaces 210 (one shown), one or more processors 212 (one shown), one or more computer-readable storage media (e.g., memory 214), one or more display screens 216 (one shown), and a direct current (DC) power source (not shown) that supplies electrical power to the various components of the user device 203. The user device 203 may also optionally include an audio input device (e.g., a microphone and/or audio input jack), a user interface (e.g., keypad, keyboard, buttons, thumbwheel, graphical user interface, touchscreen interface, and/or any other user interface), and/or an audio output device 513 (e.g., a speaker, a set of speakers, and/or an audio output jack). The audio input device and the audio output device may be integrated with the user interface where the processor 212 executes speech conversion/processing software to accept verbal commands and provide voice-synthesized responses. The user device 203 may further include various other conventional elements, including, but not limited to, one or more external memory interconnects and associated drivers to interface with one or more separate, transportable external memory devices (e.g., a Universal Serial Bus (USB) flash drive, a flash memory card, a subscriber identification module (SIM) card, a digital versatile disk (DVD), or any other portable storage device).

The user device 203 may be a fixed device, such as a desktop computer, gaming console, a kiosk, or any other stationary device that renders images for display. Alternatively, the user device 203 may be a portable device, such as a cellular phone, smartphone, tablet computer, laptop computer, portable multimedia player, personal digital assistant, or handheld gaming device. Where the user device 203 and the network 207 include wireless functionality, the user device 203 may further include one or more transceivers (not shown) and one or more antennas (not shown) as part of the network interface 210 to enable the user device 203 to communicate with a wireless portion of the network 207.

As illustrated in FIG. 2, the user device processor 212 is operably coupled to, inter alia, the network interface 210, the memory 214, and the display screen 216. The processor 212 may be operably coupled to other components of the user device 203 as may be necessary for a desired operation of the user device 203. According to one embodiment, the memory 214 stores operating instructions 218 that are executable by the processor 212 in order to enable the processor 212 to perform various functions. For example, as described in more detail below, the operating instructions 218 may include instructions for creating a graphics data representation 219 for a graphic and/or instructions for scaling a graphic represented by a graphics data representation 219 for display on the display screen 216 when the display screen 216 has a resolution that is different than a resolution at which the graphic was created. Those of ordinary skill in the art will readily recognize that the operating instructions 218 stored in the memory 214 may include a variety of other instructions that are executable by the processor 212, including, but not limited to, the user device operating system, display drivers, and various programs and applications. The memory 214 may also store one or more graphics data representations 219 created and/or configured in accordance with the present invention. The stored graphics data representation 219 may have been created by the user device processor 212 or received from a content source device 205 over the network 207. Alternatively, the graphics data representation 219 may be included in or otherwise form part of a processor-executable application stored in the memory 214.

Each content source device 205 is an electronic device that includes, inter alia, one or more communication network interfaces 220 (one shown), one or more processors 222 (one shown), one or more computer-readable storage media (e.g., memory 224), and a direct current (DC) power source (not shown) that supplies electrical power to the various components of the content source device 205. The content source device 205 may be a server, a web server, a cloud server, another user device, a digital asset management system, a data center, or a database management system.

As illustrated in FIG. 2, the content source device processor 222 is operably coupled to, inter alia, the network interface 220 and the memory 224. The processor 222 may be operably coupled to other components of the content source device 203 as may be necessary for a desired operation of the content source device 203. According to one embodiment, the memory 224 stores operating instructions that are executable by the processor 222 in order to enable the processor 222 to perform various functions. For example, as described in more detail below, the operating instructions may include instructions for creating a graphics data representation 229. The memory 224 may also store one or more graphics data representations 229 created and/or configured in accordance with the present invention. The stored graphics data representation 229 may have been created by the content source processor 222 or received from some other source over the network 207 or another network (not shown). Alternatively, the graphics data representation 229 may be included in or otherwise form part of a processor-executable application stored in the memory 224.

The user device processor 212 and the content source device processor 222 may each be a microprocessor, a microcontroller, a digital signal processor (DSP), a state machine, logic circuitry, or any other device or combination of devices that processes information based on operating or programming instructions stored in respective memory 214, 224. The user device processor 212 may include one or more graphics processors for illuminating various portions (e.g., pixels) of the display screen 216 as instructed by the processor 212. One of ordinary skill in the art will appreciate that each processor 212, 222 can be implemented using multiple processors as may be required to handle the processing requirements of the present invention and the various other included functions of the processor's respective electronic device 203, 205. One of ordinary skill in the art will further recognize that when either processor 212, 222 has one or more of its functions performed by a state machine or logic circuitry, the memory containing the corresponding operational instructions can be embedded within the state machine or logic circuitry as opposed to being external to the processor 212, 222, as are the internal memories 214, 224 illustrated in FIG. 2.

The memory 214, 224 for each device 203, 205 may be separate from the device's respective processor 212, 222 as depicted in FIG. 2 or integrated into the processor 212, 222 as discussed above. Each memory 214, 224 can include random access memory (RAM), read-only memory (ROM), flash memory, electrically erasable programmable read-only memory (EEPROM), and/or various other forms of memory as are well known in the art. It will be appreciated by one of ordinary skill in the art that the various memory components can each be a group of separately located memory areas in the overall or aggregate device memory 214, 224 and that the device memory 214, 224 may include one or more individual memory elements.

The user device's display screen 216 may be any conventional or future-developed display technology, such as a liquid crystal display (LCD), a plasma display, a light emitting diode (LED) display, an organic LED (OLED) display, or any other display technology. The display screen 216 may support a resolution (in dots per inch (dpi) or pixels per inch (ppi)) that is the same or different than a resolution at which a graphic to be displayed was created.

The network 207 includes the equipment and resources for providing communication between the user device 203 and any other device connected to the network 207, including the content source device 205. Thus, the network 207 may include multiple public and/or private networks that are communicatively coupled to one another. For example, the network 207 may include wired and/or wireless networks that are coupled together. In one embodiment, the network 207 may include a wide area wireless network, such as a cellular telephone or data network, connected to the Internet through appropriate packet data controllers and Internet gateways. Alternatively, the network 207 may include a wireless local area network, wireless home area network, or other shorter-range wireless network connected to an Internet service provider (ISP) network through a wireless router and appropriate modem. The network 207 may further include wired connections, such as, Ethernet, cable, digital subscriber line, fiber, or other wired connections as may be required to connect the user device 203 and/or the content source device 205 to an ISP network serving the service point at which the device or devices are located. The processes for connecting electronic devices to various types of networks are well known and such processes may be employed to connect the user device 203 and the content source device 205 to the network 207.

Each graphics data representation 219, 229 created in accordance with the present invention includes a set of data that represents a graphic and provides particular rules-based constraints for displaying the represented graphic on a display screen 216. Based on their particular rules, the constraints embedded within the graphics data representation 219, 229 provide criteria for scaling the graphic to resolutions other than the resolution at which the graphic was created so as to minimize distortion and improve image quality. An exemplary data format for a graphics data representation 219, 229 is illustrated in block diagram form in FIG. 3. The illustrated graphics data representation 219, 229 represents a graphic that includes two or more objects or shapes separated by one or more spatial relationships. Exemplary multi-object graphics that may be represented by graphics data representations 219, 229 in the form shown in FIG. 3 are illustrated in FIGS. 6-11 and discussed below.

Figure 3:
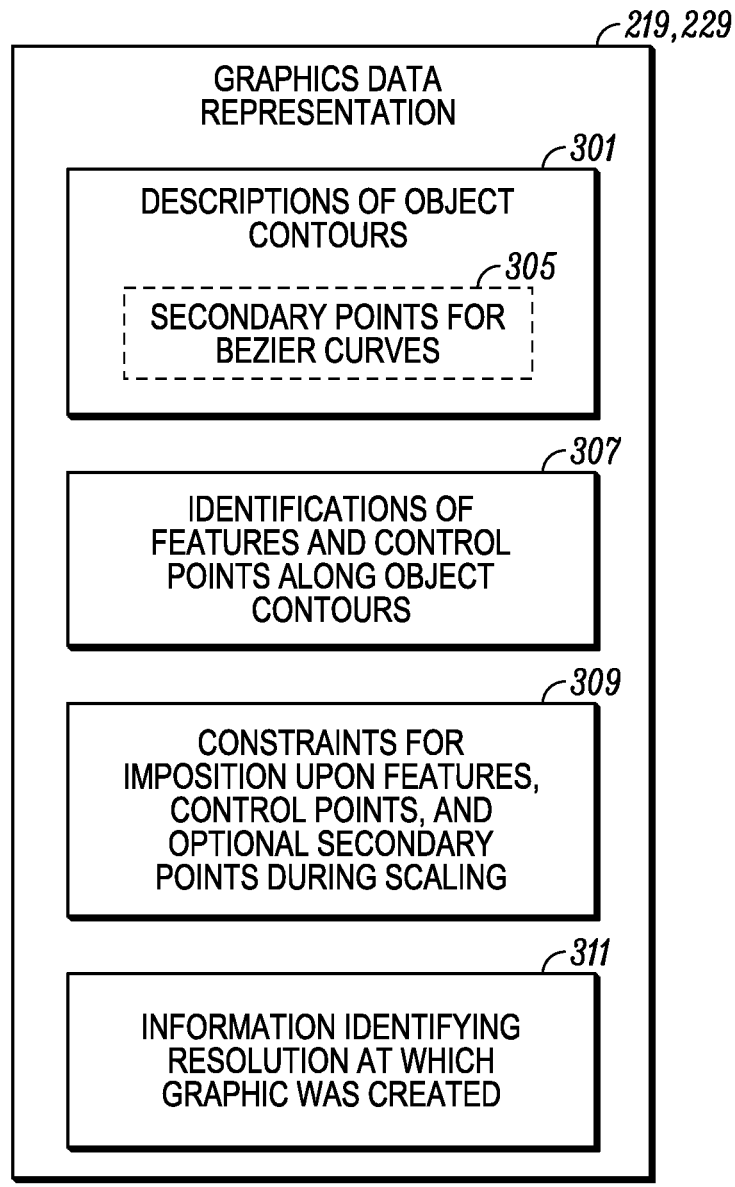
FIG. 3 illustrates an exemplary format for a graphics data representation in accordance with the present invention.

As shown in FIG. 3, the graphics data representation 219, 229 includes descriptions 301 of the graphic's object contours, identifications 307 of features and control points along the object contours, constraints 309 for imposition upon the features and the control points during scaling, and information 311 identifying the resolution at which the graphic represented by the graphics data representation 219, 229 was created. Where the graphic includes one or more Bézier curves, the graphics data representation 219, 229 may also include identifications 305 of secondary points offset from the Bézier curve or curves to provide additional reference positions to define the Bézier curve(s) of the graphic.

Figure 4:
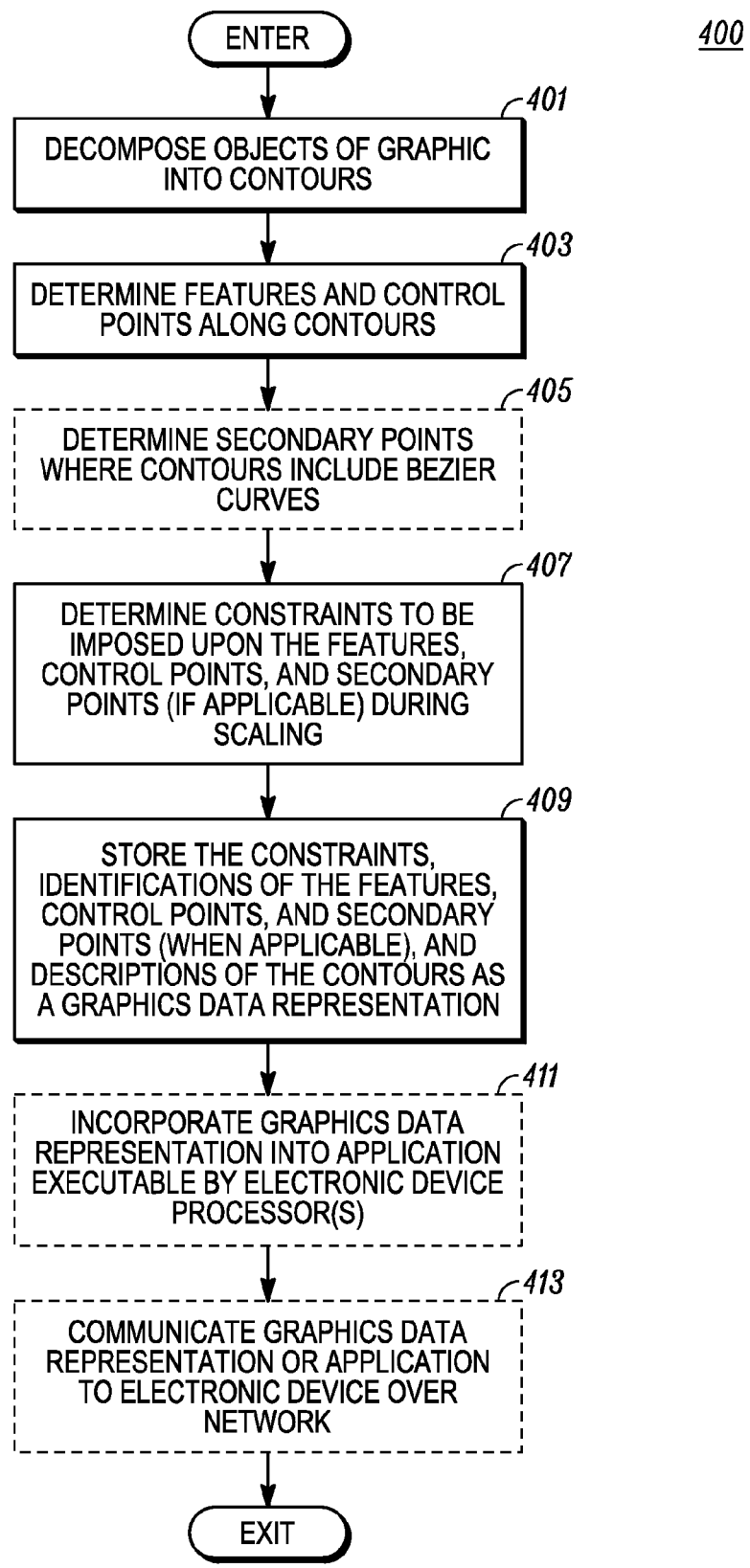
FIG. 4 is logic flow diagram of steps executed by a processor of an electronic device to create and optionally communicate a graphics data representation, in accordance with another exemplary embodiment of the present invention.

Operation of the communication system 200, the user device 203, and the content source device 205 in accordance with exemplary embodiments of the present invention may be further understood with reference to FIGS. 4-11. Referring first to FIG. 4, a logic flow diagram 400 is depicted illustrating steps executed by a processor 222 of an electronic device 205 to create and optionally communicate a graphics data representation 229 in accordance with one exemplary embodiment of the present invention. The logic flow steps may be implemented as computer or processor-readable operating instructions stored in the device memory 224.

The graphic for which a graphics data representation is to be created may have been generated in a native graphics language (NGL) using any conventional vector or bitmap graphics editing program, such as, for example, Adobe Illustrator, CorelDRAW, the GNU Image Manipulation Program (GIMP), or Adobe Photoshop. The graphic may be a logotype (logo); user interface widget; icon; or any other image; a two-dimensional object; an object that is defined in a three-dimensional model, but is being displayed on a two-dimensional device; or a combination of images and/or objects. The created graphic is stored in memory (e.g., memory 224) upon creation. The graphic may be stored alone or within an application or other program. For example, shortcut icons for computer or mobile applications typically form part of their respective applications and are installed on the user device 203 at the time the respective applications are installed. While the processes and features of the present application may be applied to all graphics, the description provided below focuses primarily on graphics that include two or more objects separated by one or more predefined spatial relationships (e.g., distances, directions, symmetry, and/or uniformity of thickness or spacing). The objects of the graphic may include text, lines, squares, rectangles, circles, ovals, triangles, cylinders, trapezoids, cones, and/or various other shapes or images, but are not exclusively text. Thus, a graphic as contemplated by the present invention may include text, but is not merely a font.

According to the graphics data representation creation process of FIG. 4, the processor 222 retrieves a graphic from memory and decomposes (401) objects of the graphic into isolatable contours, such as filled or unfilled lines, curves (including arcs), chords, and/or other general paths. In one embodiment in which the stored NGL file represents a vector graphic, decomposition of the objects may be performed by exporting the NGL file to the Scalable Vector Graphics (SVG) language as promulgated by the World Wide Web Consortium (W3C). Alternatively, the objects of the graphic may be decomposed into contours by, for example, using known posterization or image vectorization techniques.

After the graphic has been decomposed into contours, the processor 222 determines (403) features and control points along the contours. The features may include horizontal faces of lines, vertical faces of lines, angled faces of lines, parallel faces of lines, horizontal and vertical extremes of curves, inflection points of curves, junctions of lines and curves, junctions of lines of differing slopes, junctions of successive curves, centers of circles, centers of isolatable fragments of the contours, and center points of the contours. The distance between two adjacent faces bounding an interior of a contour may be considered the stroke weight of the contour. Where the contours include one or more Bézier curves, the processor 222 may further determine (405) secondary points that aid in defining the Bézier curve or curves. In one embodiment, the control points, features, and secondary points are all extracted and/or otherwise determined (e.g., computed) automatically from an SVG file or other graphics files, such as vector files (e.g., AI, CDR, CGM, DXF, EVA, EMF, Gerber, HVIF, IGES, PGML, SVG, VML, WMF, Xar) or compound files (e.g., CDF, DjVu, EPS, PDF, PICT, PS, SWF, or XAML). For example, features may be automatically generated by applying rules/algorithms to the contours, including, but not limited to: rules to identify places in the contour where two straight lines meet with differing slopes, rules to identify places where a curve joins a straight line, rules to identify places where a curve joins a curve, rules to identify inflection points in a curve (the mid-point of an S-shaped curve), rules to identify extremes of a curve, rules to identify an apex (points where two straight lines meet that are the rightmost, topmost, or bottommost point in a portion of the path), rules to identify portions of a curve that are so shallow that they would map to a straight line at expected lower resolutions, and so forth. Alternatively, the control points, features, and secondary points may be determined with user assistance through operation of graphics editing software.

In addition to determining the features, control points, and optional secondary points along the objects' contours, the processor 222 determines (407) constraints to be imposed upon the features, control points, and/or secondary points when scaling the graphic to a resolution that is different (lower or higher) than a resolution at which the graphic was originally created. The constraints may be manually generated or be algorithmically generated based on a set of rules (which could be embedded in software and need not be externally expressed). In one embodiment, the constraints may be particularly effective for use in scaling the graphic to a resolution that has a non-integer relationship with the resolution at which the graphic was created, although such constraints would also provide desired scaling where there is an integer relationship between resolutions.

Figure 6:
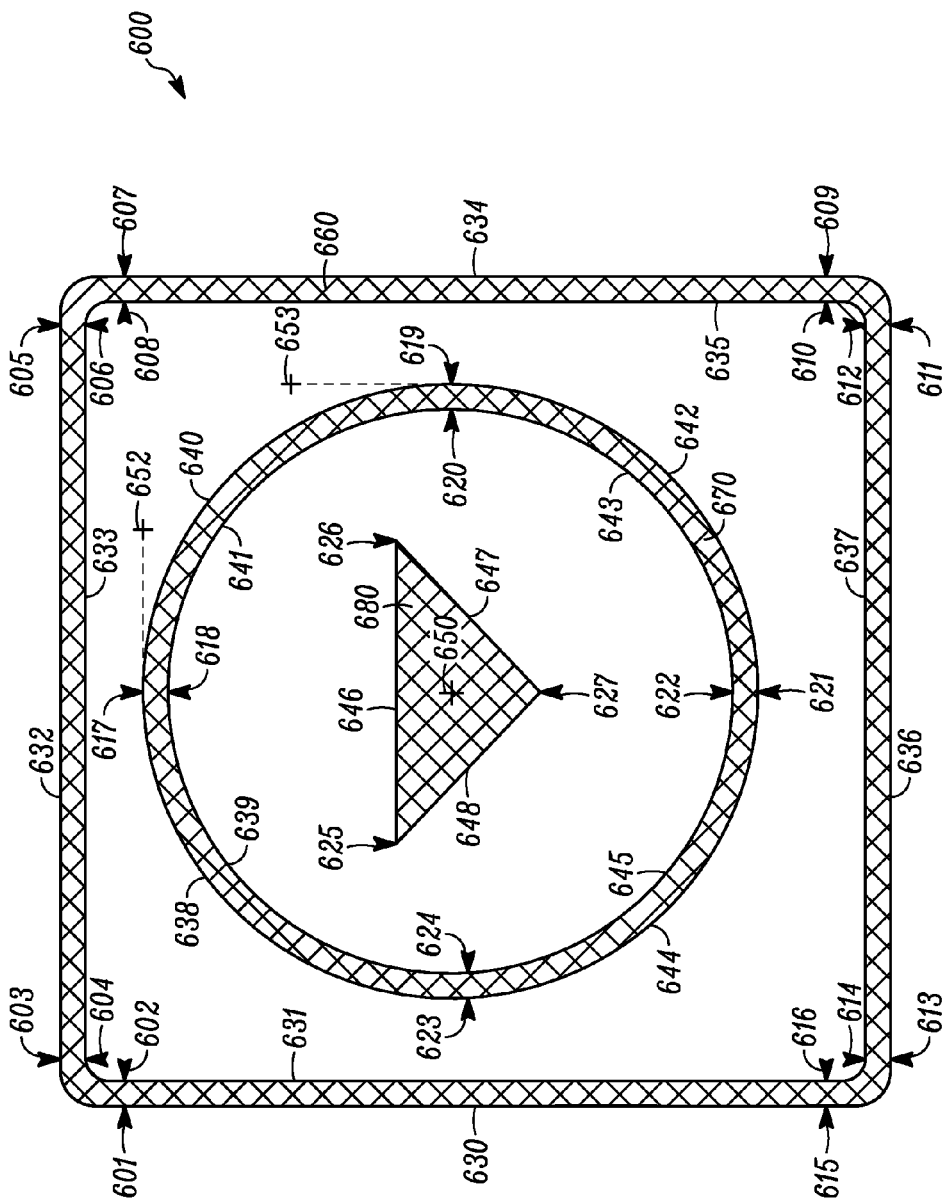
FIG. 6 illustrates an exemplary multi-object graphic and its associated contours, control points, features, and secondary points from which a graphics data representation may be created according to the logic flow of FIG. 4.
Figure 7:
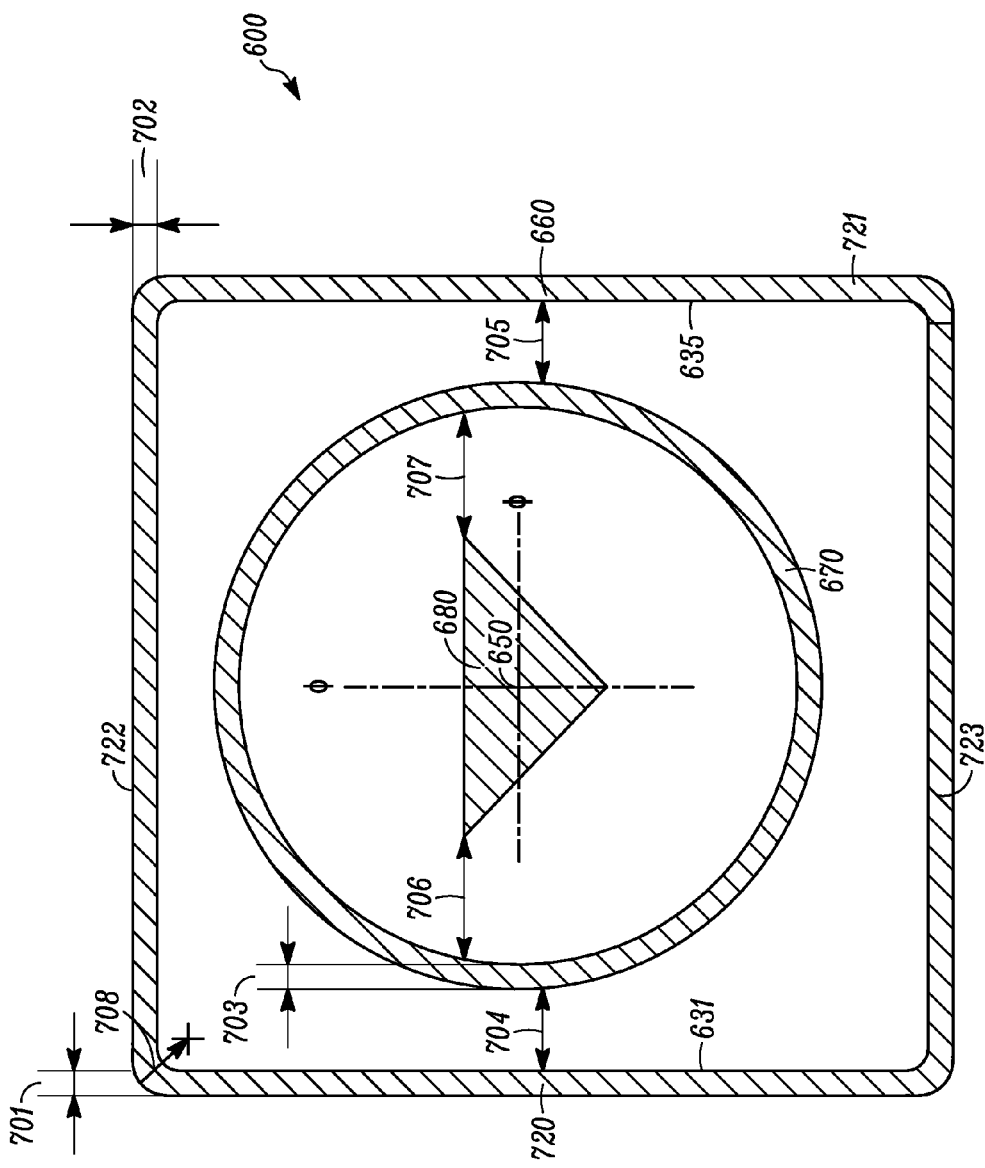
FIG. 7 illustrates exemplary constraints for the multi-object graphic of FIG. 6 for use in creating a graphics data representation according to the logic flow of FIG. 4.

To illustrate the process of determining features, control points, and secondary points for object contours of a graphic, as well as determining constraints to be imposed upon the features, control points, and/or secondary points during scaling, reference is made to the exemplary multi-object graphic 600 depicted in FIGS. 6 and 7. As illustrated in the two figures, the exemplary graphic 600 includes three nested, concentric objects centered at a center point 650. The objects are a rectangular border having rounded corners 660, a circular border 670, and a triangle 680. The graphic 600 may be used as an icon, logo, user interface widget, or for any other purpose. The rectangular border 660 includes two rectangular with rounded corner contours separated by a space, which may be filled with a desired color, pattern, and/or texture. The inner contour of the rectangular border 660 is defined by the path consisting of line 631, the arc from control point 602 to control point 604, line 633, the arc from control point 606 to control point 608, line 635, the arc from control point 610 to control point 612, line 637, and the arc from control point 614 to control point 616. The outer contour of the rectangular border 660 is defined by the path consisting of line 630, the arc from control point 601 to control point 603, line 632, the arc from control point 605 to control point 607, line 634, the arc from control point 609 to control point 611, line 636, and the arc from control point 613 to control point 615. The circular border 670 includes two circular contours separated by a space, which may be filled with a desired color, pattern, and/or texture. The inner contour of the circular border 670 is defined by the path consisting of the arc 641 from control point 618 to control point 620, the arc 643 from control point 620 to control point 622, the arc 645 from control point 622 to control point 624, and the arc 639 from control point 624 to control point 618. The outer contour of the circular border 670 is defined by the path consisting of the arc 640 from control point 617 to control point 619, the arc 642 from control point 619 to control point 621, the arc 644 from control point 621 to control point 623, and the arc 638 from control point 623 to control point 617. The triangle 680 may be a single contour consisting of lines 646-648 and vertices at control points 625-627. The triangle 680 may also be filled with a desired color, pattern, and/or texture. With respect to the figures, FIG. 6 identifies exemplary contours, control points, features, and secondary points of the graphic's objects and FIG. 7 identifies exemplary constraints to be imposed upon the features, control points, and/or secondary points.

With respect to the graphic 600 of FIG. 6, the processor 222 may decompose (401) the rectangular border 660, the circular border 670, and the triangle 680 into their respective contours. For example, the processor 222 may decompose the rectangular border 660 into its two contours (e.g., a rectangular inner contour and a rectangular outer contour separated by a space) and their associated line and arc primitives. Alternatively, the arcs of the rectangular border's contours may be decomposed into Bézier curves. Additionally, the processor 222 may decompose the circular border 670 into its two contours (e.g., an inner circle and an outer circle separated by a space). Each circular contour may be decomposed into a circle primitive or a 4-piece Bézier curve. Further, the processor 222 may decompose the triangle 680 into a single contour.

The processor 222 may then determine (403) the features and control points along the contours. For example, the features along the contours of the rectangular border 660 may include pairs of outer and inner faces (e.g., along inner and outer sides of lines 630-637) for each line segment 720-723 of the border 660. The features may also include junctions of the lines 630-637 and their interconnecting arcs, and lengths of the lines 630-637. The features may further include the outer and inner lines 630-631, 634-635 of the rectangular border's vertical line segments 720, 721 being parallel to one another, and the outer and inner lines 632-633, 636-637 of the rectangular border's horizontal line segments 722, 723 being parallel to one another. In general, features along an object's contour may include one or more of: horizontal faces of lines, vertical faces of lines, angled faces of lines, parallel faces of lines, horizontal and vertical extremes of curves, inflection points of curves, junctions of lines and curves, junctions of lines of differing slopes, junctions of successive curves, centers of circles, centers of isolatable fragments of the contours, and center points of the contours. Other features may include construction lines and extrapolations; midpoints, centers, or weighted-centers of construction lines, arcs, chords, faces, or contours; points that are not part of contour definitions (e.g., synthetic points); and/or other constructs that are used to determine the position or alignment, which are not rendered as part of the final image.

Where the contours of the circular border 670 have been decomposed into an n-piece Bézier curve, the features along the contours of the circular border 670 may include junctions of the arcs 638-645, midpoints of the arcs 638-645 (not shown), the extremes of the circular border's inner contour (which are, in this case, coincident with control points 618, 620, 622, and 624), the extremes of the circular border's outer contour (which are, in this case, coincident with control points 617, 619, 621, and 623), the center of the circle (which is the same as the center point 650 of the graphic 600 in this case), as well as other features as discussed above. Where the contours of the circular border 670 have been decomposed into circle primitives, the features along the contours may include the radii of the circle primitives, as well as other features as discussed above. The features of the triangle 680 may include horizontal and angled faces of the triangle's contour lines 646-648, the lengths of the triangle's contour lines 646-648, and the three corner points or vertices (at the locations of control points 625-627). The center point 650 of the graphic 600 may be an additional feature for each of the objects 660, 670, 680.

The control points along the contours of the rectangular border 660 may include control points 601-616 positioned on the inner and outer contours at the junctions between the lines 630-637 and their interconnecting arcs. The control points along the contours of the circular border 670 may include control points 617-624 positioned on the outer and inner contours at the junctions of the circle's arcs. The control points along the triangle 680 may include control points 625-627 positioned at the vertices of the triangle 680. Finally, the center point 650 of the graphic 600 may be used as a control point common to all three objects 660, 670, 680 and their respective contours.

The exemplary graphic 600 illustrated in FIG. 6 includes various arcs that may be modeled as Bézier or parametric curves. As a result, the processor 222 may determine secondary points for such curves for purposes of creating the graphics data representation 229 of the graphic 600. FIG. 6 illustrates exemplary secondary points 652, 653 for the upper right arc 640 of the circular border's outer contour. As shown, the secondary points 652, 653 will typically be offset from the subject Bézier curve or a portion thereof. The quantity of secondary points may vary depending on the order of the Bézier curve, but two secondary points will typically provide sufficient additional reference positions to define the curve for second or higher order curves. In one embodiment, a four-piece cubic Bézier curve may be used to approximate each contour of the circular border 670. As is known, where an n-piece cubic Bézier curve is used to approximate a circle, each secondary point is located (4/3)·tan(t/4) radians from a control point on the circle, where t is 360/n degrees and n>2. Therefore, where a 4-piece cubic Bézier curve is used to approximate the outer contour of the circular border 670 shown in FIG. 6, secondary point 652 may be located (4/3)·tan(90/4) radians from control point 617 and secondary point 653 may be located (4/3)·tan(90/4) radians from control point 619. Additional secondary points (not shown) may be appropriately located relative to control points 617-624 of the circular border 670 to aid in defining the arcs 638-645 of the inner and outer contours. Further, pairs of secondary points may be determined for the arcs used to interconnect the lines 630-637 of the inner and outer contours of the rectangular border 660. Such secondary points (not shown) would be offset from the contours and positioned appropriately relative to the control points 601-616 of the rectangular border 660. The locations of these secondary points may be determined using Bernstein basis polynomials, as is known in the art.

Besides determining features, control points 601-627, and secondary points 652-653 for the graphic 600, the processor 222 determines (407) constraints to be imposed upon the features, control points 601-627, and secondary points 652-653 during any future scaling of the graphic 600. Such constraints may be automatically generated by applying a set of rules/algorithms for analyzing the contours and features for potential constraints, including, but not limited to: rules for identifying the outer faces that would be snapped to a full pixel position, rules for identifying the extremes of a curve that would be snapped to a full or half pixel boundary (to control the curve quality), rules for identifying the distance from a center point to a face or extreme where there is another face or extreme in the opposite direction from the center at the same distance or at a distance that would potentially become coerced/constrained to the same distance when scaled to a potential target resolution, rules for identifying distances at the point of closest approach between any two contours, rules for identifying the spacing between any sequence of objects, rules for identifying the successive lengths of a series of objects where the center or one end of those objects are aligned to a common position, rules for identifying any repeating thicknesses or repeating space measurements, as well as any of the other constraints described hereinabove and hereinbelow. Alternatively, the constraints may be manually generated, such as by adding extensions to the SVG file (or an NGL format) for the graphic, where the extensions identify the features and the associated constraints. FIG. 7 illustrates exemplary constraints for the graphic 600 of FIG. 6. Such constraints may relate to the distance or width 701 between inner and outer contour lines of each vertical line segment 720, 721 of the rectangular border 660, the distance or width 702 between inner and outer contour lines of each horizontal line segment 722, 723 of the rectangular border 660, and the distance or width 703 between inner and outer contours of the circular border 670. For example, such a constraint may require the widths 701, 702, 703 to be equal or otherwise maintain a defined relationship (e.g., widths 701 and 702 are equal and width 703 is a predefined percentage of width 701).

Additional constraints preferably define spatial relationships between the objects 660, 670, 680 of the multi-object graphic 600. For instance, one constraint may require that the distances between particular control points along the outer contour of the circular border 670 and portions of the inner contour of the rectangular border 660 be equal. For example, such a constraint may require that the distance 704 between control point 619 and vertical line 635 of the rectangular border's inner contour be equal to the distance 705 between control point 623 and vertical line 631 of the rectangular border's inner contour. A further constraint may require that the distances between particular vertices of the triangle 680 and the nearest points on the inner contour of the circular border 670 be equal. For example, such a constraint may require that the distance 706 between control point 625 and the nearest point on arc 639 be equal to the distance 707 between control point 626 and the nearest point on arc 641. Yet a further constraint may require that the radius 708 of each arc interconnecting two lines of the outer contour of the rectangular border 660 be a predefined percentage (e.g., 150%) of the rectangular border width 701. Yet another constraint may require the center point 650 of the graphic 600 to be aligned on a pixel or midway between pixels. Thus, the constraints may be intra-contour constraints (e.g., distances or other relationships between contours of the same object), inter-contour constraints (e.g., distances or other relationships between contours of different objects of the graphic 600), or both.

Depending on the configuration of the particular graphic, the constraints may include a variety of other rules, including but not limited to rules for: aligning some or all of the features and the control points to full pixel boundaries of a display, mid-pixel boundaries of the display, or particular distances between full pixel boundaries of the display; aligning some or all of the features so as to be particular distances from other features; maintaining desired thicknesses or widths of lines used to create one or more of the features; maintaining a desired overall width of the graphic; maintaining a desired midpoint between any two of the control points; and maintaining a desired midpoint between any two of the features. Additionally, for angled junctions, a constraint may provide that when one face or line is moved inward or outward by a given distance, the junction point is moved both by that distance in the specified direction and along the perpendicular axis by the amount calculated based on the inner subtended angle, such that the point is moved along the connected (non-moving) face or line. Further, two or more constraints may apply to a single control point or feature. For example, one constraint may require control point 626 to be aligned on a pixel boundary and another constraint may require the distance 707 between control point 626 and the nearest point on arc 641 of the circular border 670 to be the same as the distance 706 between control point 625 and the nearest point on arc 639 of the circular border 670.

Figure 10:
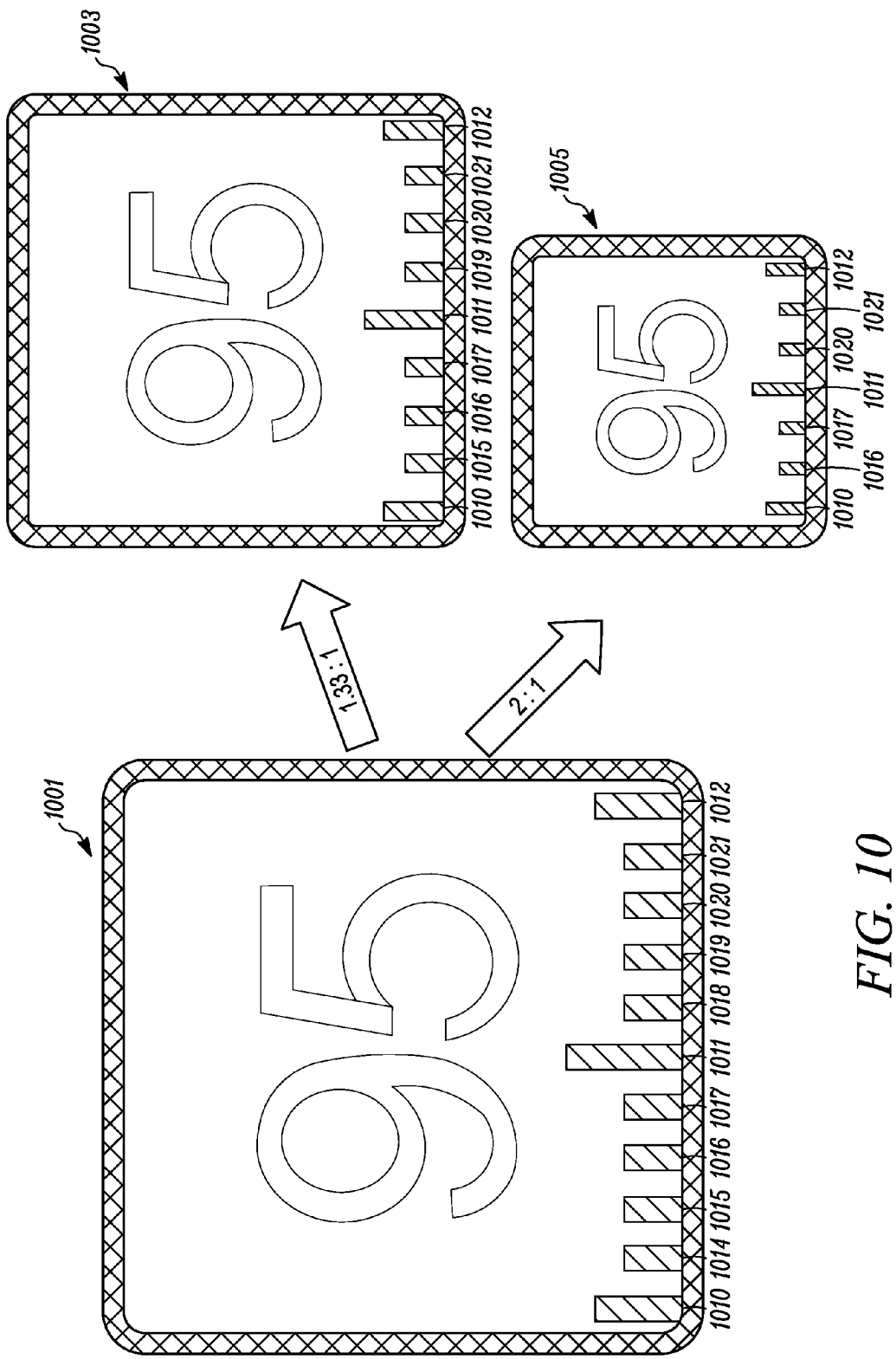
FIG. 10 illustrates integer and non-integer, high-to-low resolution scaling of another exemplary multi-object graphic represented by a graphics data representation that includes an exemplary set of feature simplification constraints, in accordance with another embodiment of the present invention.
Figure 11:
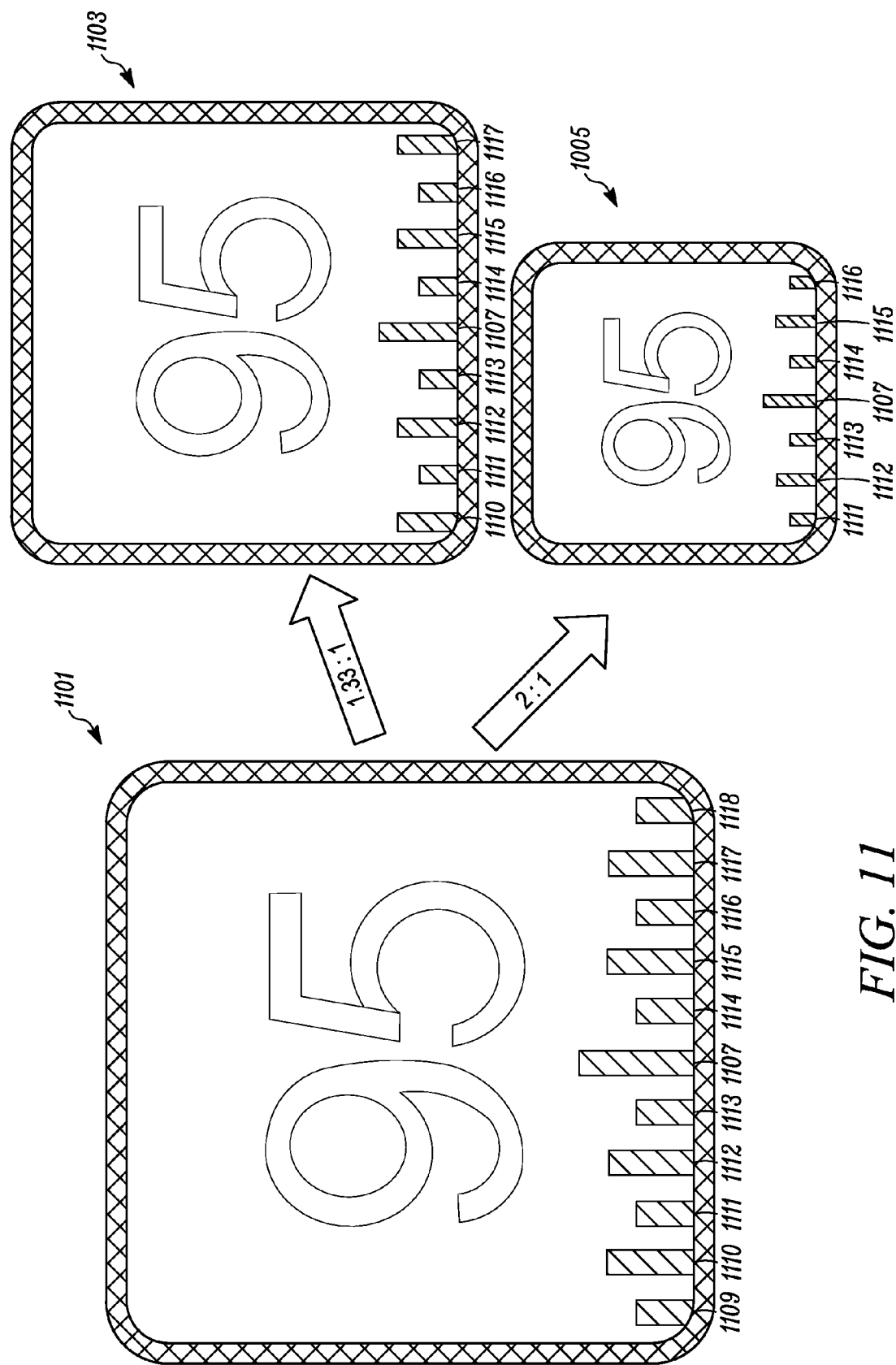
FIG. 11 illustrates integer and non-integer, high-to-low resolution scaling of yet another exemplary multi-object graphic represented by a graphics data representation that includes another exemplary set of feature simplification constraints, in accordance with a further embodiment of the present invention.

A further set of constraints may provide rules for simplifying the features, contours, and/or objects based on a scaling value or factor determinable from the resolution at which the graphic was created and a resolution at which the graphic may be displayed. For example, such rules may include rules for collapsing a feature dimension to zero when the feature dimension must be adjusted to be less than a threshold quantity of pixels based on the scaling relationship between the resolution at which the graphic was created and the resolution at which the graphic is to be displayed. Such rules may also or alternatively include rules for removing features and control points along one or more of the plurality of contours based on the scaling relationship. Exemplary graphics 1001, 1101 that may be subject to simplification constraints are illustrated in FIGS. 10 and 11, and are discussed in more detail below with regard to scaling such graphics 1001, 1101 based on graphics data representations 219, 229 created for them.

In an alternative embodiment, the rectangular border 660 and the circular border 670 may be decomposed into single, thick contours, with the line and arc components of the rectangular border 660 having one width 701 and the circle primitive component or arc components, as applicable, of the circular border 670 having the same or another width 703. The widths 701, 703 of the two borders 660, 670 may be filled with a desired color, pattern, and/or texture. In this case, the contour of the rectangular border 660 is defined by the path consisting of line segment 720, an arc segment from control points 601-602 to control points 603-604, line segment 722, an arc segment from control points 605-606 to control points 607-608, line segment 721, an arc segment from control points 609-610 to control points 611-612, line segment 723, and a final arc segment from control points 613-614 to control points 615-616. The contour of the circular border 670 may be a single circle primitive of width 703, which width may be filled with a desired color, pattern, and/or texture. In this embodiment, each line segment 720-723 of the rectangular border 660 may be constructed as a path including an inner line, a spaced outer line, and perpendicular lines running across the width 701 of the line segment 720-723 and connecting respective ends of the inner and outer lines. Additionally, each arc segment of the rectangular border 660 may be constructed as a path including an inner arc, a spaced outer arc, and lines crossing the widths 701 of the to-be-connected line segments and connecting respective ends of the arcs. For example, line segment 720 may be constructed as a path including line 630 (outer line), line 631 (inner line), a line (not shown) connecting ends of the two lines 630, 631 at control points 601-602, and a line (not shown) connecting ends of the two lines 630, 631 at control points 615-616. As an example for constructing an arc segment in this embodiment, the arc segment connecting line segment 720 and line segment 722 may be constructed as a path including an inner arc from control point 602 to control point 604, an outer arc from control point 601 to control point 603, a line (not shown) connecting control points 601 and 602, and a line connecting control points 603 and 604. In this embodiment, additional constraints would likely be required as part of the graphics data representation 219, 229 to keep the line segments 720-723 of the rectangular border 660 abutted to and aligned with their respective arc segments so as to properly maintain the shape of the rectangular border 660 during scaling.

Additionally, if font glyphs are embedded in the graphic as font glyphs (as opposed to contours) and contain font hints, the font hints can be honored as constraints for the font glyphs. However, if the font glyphs have been converted to graphic contours and the hints have been removed, or the font glyphs contain font hints that can't be processed by the processor 222, or the font glyphs do not contain font hints, then the font glyphs can be hinted or re-hinted manually and/or algorithmically as part of the constraint determination process.

After the features, control points, secondary points (if applicable), and constraints have been determined, the processor 222 stores (409) the constraints, identifications of the features, control points, and secondary points (if any), descriptions of the contours, and any other necessary rendering information (if any) as a graphics data representation 229 for the graphic. The file format for the graphics data representation 229 may be as generally depicted in FIG. 3, although other file formats may be used that include necessary data defining the graphic (e.g., descriptions of object contours and identifications of features, control points, and secondary points (if any) along the object contours), as well as a set of constraints for scaling the graphic for display. A graphics data representation 229 for a graphic as contemplated by the present invention would replace several individual bitmap versions of the graphic, which would be otherwise generated and stored for each possible display resolution of the graphic in accordance with prior art graphics generation processes. The graphics data representation 229 of the present invention permits display of a represented graphic at any display resolution while minimize blurring and other artifacts associated with low quality images.

In one embodiment, the above-described process for creating a graphics data representation 229 may by implemented as an extension to the SVG language. Alternatively, the process for creating a graphics data representation 229 may be implemented as metadata in an SVG file; as an extension to an NGL format; as metadata in an NGL format; as a proprietary graphics data representation format replacing the NGL, which holds a representation of the contours and other rendering information extracted from the NGL plus the features, and constraints; or as separately stored "sidecar" information that can be uniquely associated with the corresponding NGL graphic at the time the graphic is being scaled and processed for rendering at the target resolution.

After the graphics data representation 229 for the particular multi-object graphic has been created and stored, the processor 222 may optionally incorporate (411) the graphic data representation 229 into an application executable by a processor 212 of the user device 203 (i.e., the electronic device 203 that will be displaying the graphic). For example, the graphic data representation 229 may be included in a software application (e.g., in an icon folder or other location of the application) or be included with the application in an accompanying graphics file. The graphics data representation 229 or the application containing it may be communicated (413) to the user device 203 over the network 207 via the network interfaces 210, 220 of the two devices 203, 205. In one embodiment, the network 207 may include the Internet and the device 205 at which the graphic data representation 229 is stored may be a web server. In such a case, the user device 203 may retrieve the graphics data representation 229 from the web server in response to receiving appropriate input from a user of the user device 203. Alternatively, the user device 203 may receive or retrieve the graphics data representation 229 automatically in response a request to supply the icon from the application software running on the user device 203. Further, the graphics data representation 229 may be present to the user device 203, in anticipation of the graphics data representation 229 being needed when other data related to a server-supplied webpage or application is transmitted, and then locally cached in the memory 214 of the user device 203 until used.

One of ordinary skill in the art will also readily recognize and appreciate that the graphics data representation 229 may be created and stored by one electronic device (e.g., a computer operated by a graphics designer) and further stored at another device (e.g., a web server). In such a case, the subsequent storage device (e.g., the web server) may be the device that communicates the graphics data representation 229 to the user device 203 over the network 207. Still further, the graphics data representation 229 may be stored on a portable storage device, such as a thumb drive, flash drive, digital versatile disk (DVD), a memory card, or any other portable memory device, and transferred to the user device 203 by connecting the portable storage device to an appropriate interface (not shown) of the user device 203. Thus, the above-described network conveyance of the graphics data representation 229 to the user device 203 is merely exemplary and not exclusive. The storage devices in which the graphics data representation 229 may be stored are computer or processor-readable media, as is well understood in the art.

The above description relating to creating or producing a graphics data representation 229 focused on creation of the graphics data representation 229 by a content source device 205 that is coupled to a network 207 over which the graphics data representation 229 may be communicated to the user device 203 either automatically (e.g., as part of a software update) or in response to user input (e.g., in response to selection of the graphic or an application containing it for download from a website). However, in an alternative embodiment, the user device 203 may create the graphic data representation 219 according to the logic flow described above with respect to FIG. 4 based on a graphic generated by a user of the device 203 using a graphics editing program. In such a case, the processor 212 of the user device may perform logic flow steps 401-409 and either store the graphics data representation 219 in memory 214 for later retrieval and display or incorporate (411) the graphics data representation 219 into an application executable by the user device processor 212, such that execution of the application by the processor 212 causes the graphics data representation 219 to be retrieved and displayed on the display screen 216 of the user device 203.

Figure 5:
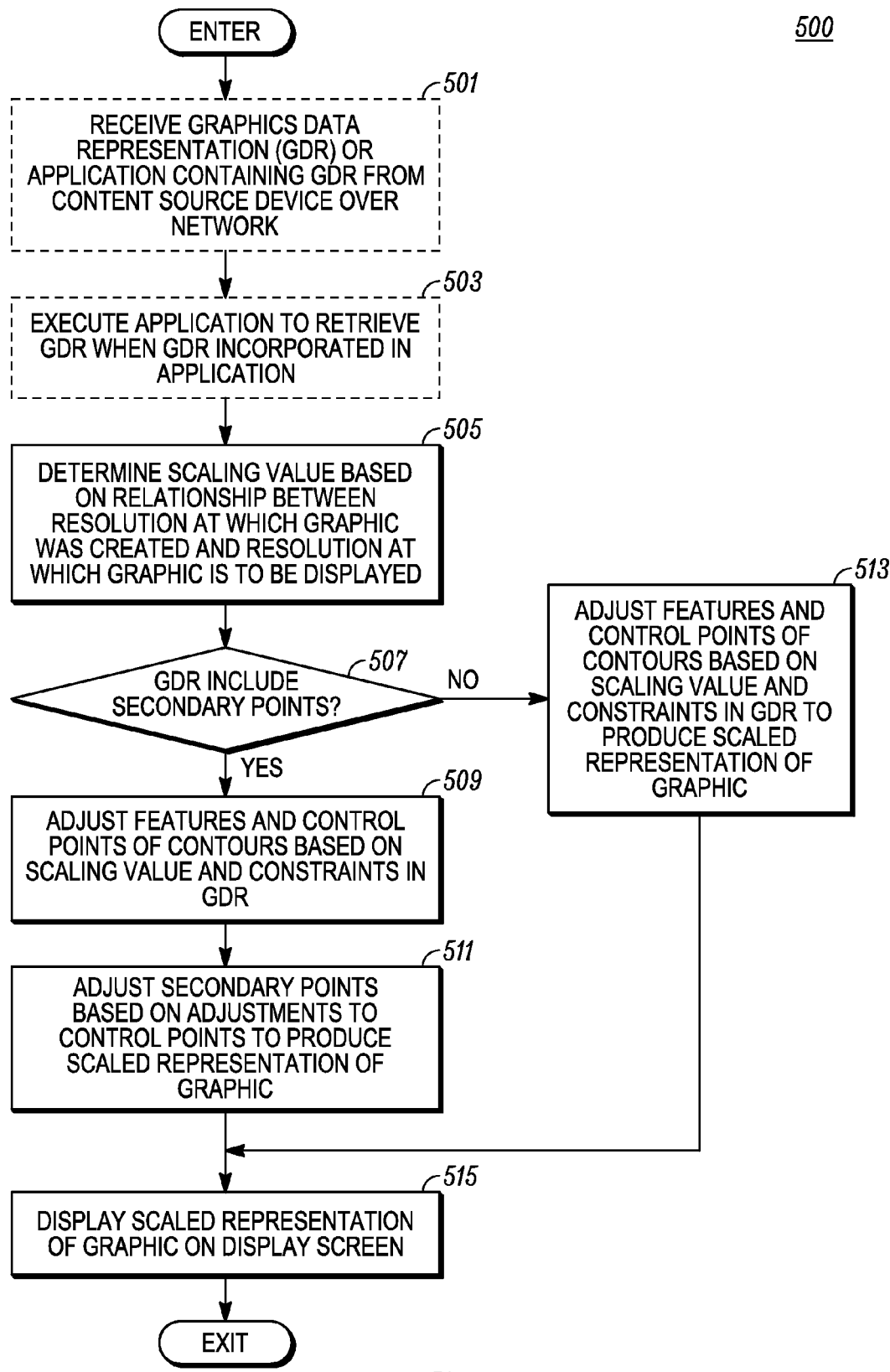
FIG. 5 is logic flow diagram of steps executed by a processor of an electronic device to scale a graphic defined by a graphics data representation and display the scaled graphic on a display screen of the electronic device, in accordance with a further exemplary embodiment of the present invention.

Referring now to FIG. 5, there is illustrated an exemplary logic flow diagram 500 of steps executed by the processor 212 of the user device 203 to scale a graphic defined by a graphics data representation (GDR) 219, 229 and display the scaled graphic on the display screen 216 of the user device 203. Some or all of the logic flow steps of FIG. 5 may be implemented as computer or processor-executable operating instructions 218 stored in the user device memory 214.

According to the exemplary logic flow illustrated in FIG. 5, the user device processor 212 optionally receives (501) a graphics data representation 229 or an application containing it from a content source device 205 over a network 207. Alternatively, the user device 203 may have been used to create the graphic data representation 219 originally in accordance with the logic flow 400 of FIG. 4 or the graphic data representation 219 may have been created using another electronic device and transferred to the user device 203 via a portable storage device. The received or stored graphics data representation 219 may represent any multi-object graphic, including, but not limited to, the exemplary graphics 600, 800, 1001, 1101 illustrated in FIGS. 6, 8, 10, and 11. The received or created graphics data representation 219 or the application containing it is stored in user device memory 214 until a graphic represented by the graphics data representation 219 is to be displayed in original or scaled format on a display screen 216 of the user device 203. When the graphics data representation 219 is incorporated in an application received over a network 207 or otherwise obtained by the user device 203, the user device processor 212 may execute (503) the application in order to retrieve the graphics data representation 219 for further scaling, if necessary, prior to display.

After obtaining the graphics data representation 219, the user device processor 212 determines (505) a scaling value based on a relationship between the resolution at which the graphic was created and the resolution at which the graphic is to be displayed. For example, the processor 212 may determine a ratio of the two resolutions as the scaling value by extracting from the graphics data representation 219 the information regarding the resolution at which the graphic was created and determining the current settings for the resolution of the display screen 216 from the display driver or display settings of the electronic device's operating system.

In addition to determining a scaling value, the user device processor 212 determines (507) whether the graphics data representation 219 includes identifications of secondary points, which would indicate the presence of one or more Bézier curves forming part of one or more contours of the graphic's objects. Such a determination may be made from the content of the graphics data representation 219 and may be inherently performed as part of adjusting the features, control points, and secondary points of the graphic's contours during scaling as discussed below.

In the event that the graphics data representation 219 includes secondary points (and accordingly the graphic's object contours include one or more Bézier curves), the processor 212 adjusts (509) the features and control points of the object contours based on the determined scaling value and the constraints in the graphics data representation 219. For example, the positions of the control points may be adjusted according to the constraints to align the control points at full or mid pixel boundaries at the resolution at which the graphic is to be displayed. Such repositioning of the control points serves to adjust the features to which the controls points are associated for best appearance. Additionally, the processor 212 adjusts (511) the secondary points based on adjustments made to control points with which the secondary points are associated. For example, as described above, the locations of secondary points are generally geometrically related to the locations of their associated control points. Therefore, in one embodiment, positions of the secondary points may be adjusted through linear interpolation separately along the x-axis and y-axis relative to the positions of their respective control points before and after adjustment of the control point positions. The result of the adjustments to the features, control points, and secondary points is a scaled representation of the graphic. In the event that the graphics data representation 219 excludes secondary points, the processor 212 adjusts (513) the features and control points of the graphic's object contours based on the determined scaling value and the constraints in the graphics data representation 219 to produce the scaled representation of the graphic. In one embodiment, where the graphics data representation 219 is in a modified SVG file format (e.g., SVG with extensions to add constraints to the features, control points, and secondary points (where applicable) of the graphic's object contours), the processor 212 may process the compiled modified SVG file to effectively perform the adjustments to the features, control points, and secondary points (where applicable) of the object contours as contemplated by blocks 509, 511, and 513 of FIG. 5.

After the scaled representation of the graphic has been produced, the processor 212 displays (515) the scaled representation of the graphic on the user device's display screen 216. For example, the scaled graphic may be stored in display memory (not shown) at the location specified by the display driver, which may form part of the processor's operating instructions 218. The displayed graphic is of a higher quality than prior art scaled graphics because the graphic data representation 219 includes constraints for the features, control points, and secondary points along the graphic object's contours to mitigate blurring, misalignment of objects, and other undesired artifacts typically encountered when relying on conventional scaling techniques, especially where the relationship between the display resolution and the resolution at which the graphic was created is non-integer.

Figure 8:
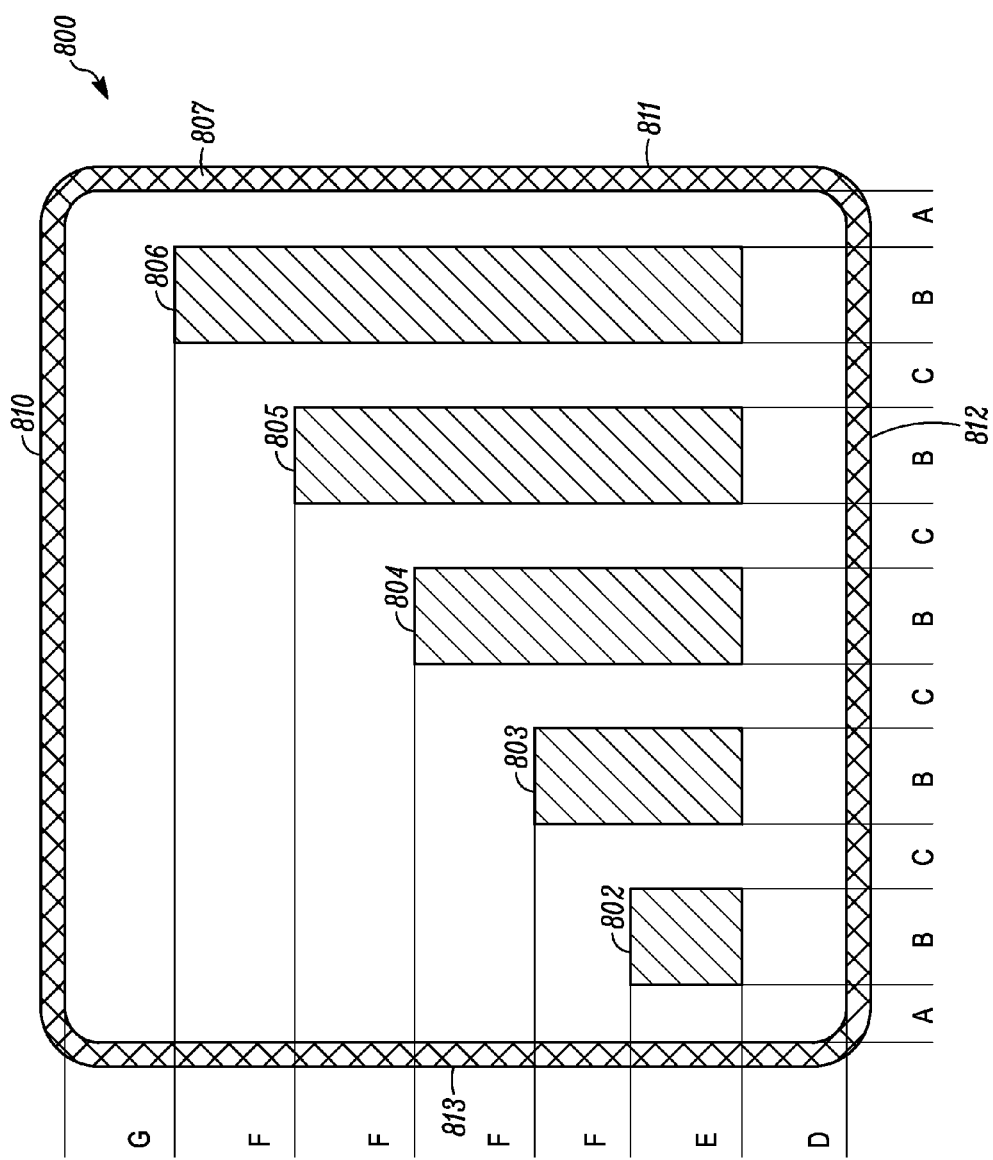
FIG. 8 illustrates another exemplary multi-object graphic and its associated contours, features, and constraints from which a graphics data representation may be created according to the logic flow of FIG. 4.
Figure 9:
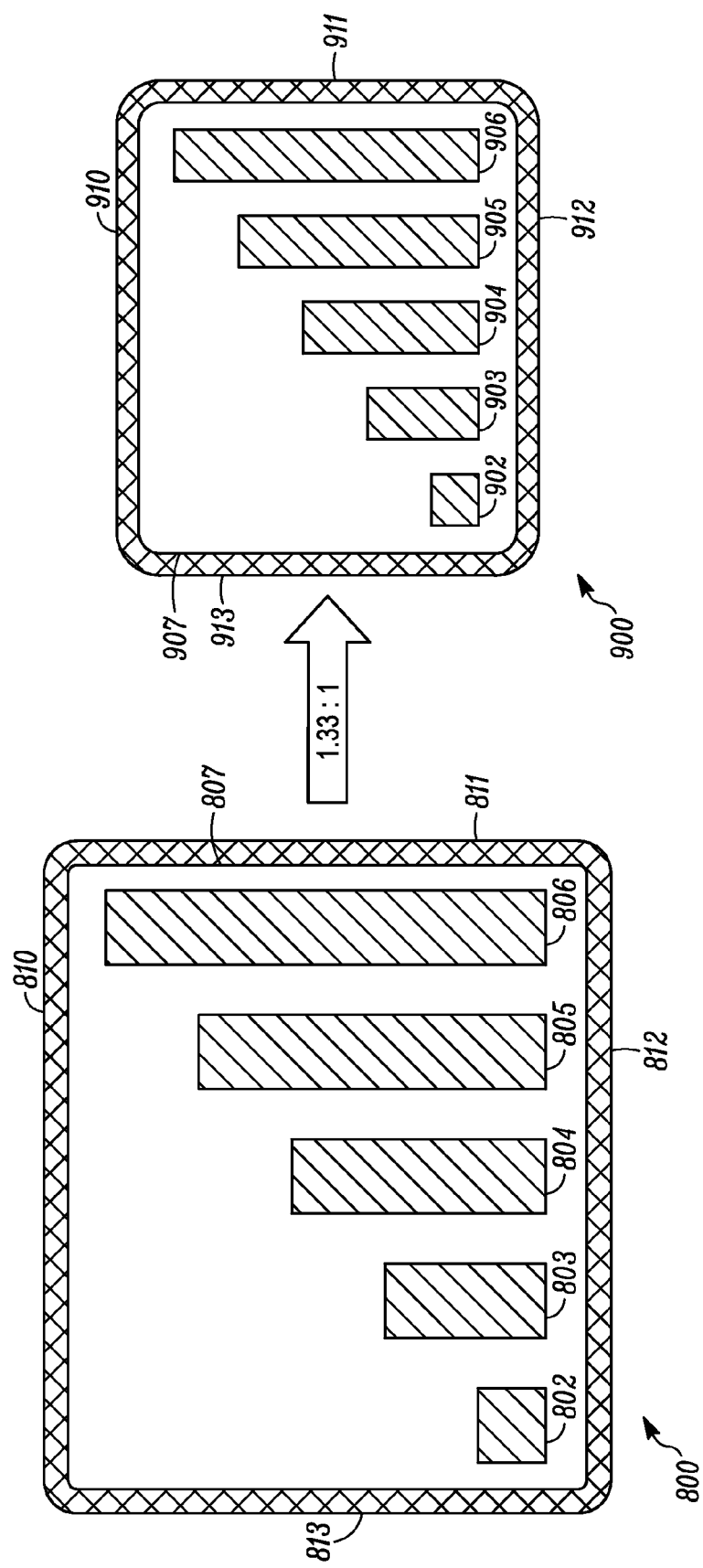
FIG. 9 illustrates non-integer, high-to-low resolution scaling of the multi-object graphic of FIG. 8 according to the logic flow of FIG. 5.

FIGS. 8 and 9 provide one exemplary illustration of how a multi-object graphic 800 for which a graphics data representation 219, 229 is created according to the logic flow 400 of FIG. 4 may be scaled and displayed in accordance with the logic flow 500 of FIG. 5. As illustrated in FIG. 8, the graphic 800 includes six objects, five progressive-height bars 802-806 within a rectangular border having rounded corners 807. The rectangular border 807 may include four filled lines 810-812 interconnected at each junction by a filled arc. Alternatively, the rectangular border 807 may include two contours separated by a width and be filled between the two contours. In such a case, the inner contour is an inner rectangular line with rounded corners and the outer contour is an outer rectangular line with rounded corners. In the latter case, the rectangular border 807 of FIG. 8 may be similar or even identical to the rectangular border 600 of FIG. 6. Each progressive-height bar 802-806 within the border 807 has a common width but different height, with bar 802 being the shortest and bar 806 being the tallest. The graphic 800 may be used as a graphic for indicating signal strength on a display screen of a smartphone or other electronic device with wireless communication capability. The graphic 800 may alternatively be used to indicate remaining battery power for the user device 203 or for any other desired purpose.

As illustrated in FIG. 8, the graphics data representation 219, 229 for the graphic 800 includes several intra-contour and inter-contour constraints relating to various features along the contours of the graphic's objects, including the widths or thicknesses of the progressive-height bars 802-806, the lengths or heights of the bars 802-806, the spatial relationships between neighboring faces of each of the bars 802-806, the spatial relationships between faces of the bars 802-806 and interior faces of the lines 810-813 of the rectangular border 807, and a width or thickness of the rectangular border 807. For instance, each of the progressive-height bars 802-806 may be required to have a common width, B, and be separated from its neighboring bar by a common distance, C. Additionally, the exterior faces of the outermost progressive-height bars 802, 806 may be required to maintain the same distance, A, from interior faces of neighboring vertical lines 813, 811 or contours of the rectangular border 807. Further, a ratio of the distance, D, between the base faces of the progressive-height bars 802-806 and the interior face of the bottom horizontal line 812 of the rectangular border 807, and the distance, G, between the top face of the tallest progressive-height bar 806 to the interior face of the top horizontal line 810 of the rectangular border 807 may need to be maintained. Still further, each neighboring pair of progressive-height bars 802-806 may be required to maintain a common difference in height, F. Finally, a ratio of the height (E+4F) of the tallest bar 806 to a height, E, of the shortest bar 802 may need to be maintained. Other constraints may include aligning certain control points or features, such as midpoints of the progressive-height bars 802-806 or interior or exterior faces or edges of the bars 802-806, to full or mid pixel boundaries, prioritizations of the constraints (e.g., maintaining the common widths of the progressive-height bars 802-806 has a higher priority than maintaining a common distance between the exterior faces of the outermost bars 802, 806 and the interior faces of neighboring vertical lines 813, 811 of the rectangular border 807), maintaining a width of the progressive-height bars 802-806 to be less than or equal to a width of the spaces between the bars 802-806, maintaining a width of each progressive-height bar 802 and each space between them to at least one pixel, approximately maintaining the proportionate relationship between the widths or thicknesses of the bars 802-806 and the spaces therebetween, maintaining the spacing between the bars 802-806 as being greater than or equal to the spacing between the first/last bar 802, 806 and the adjacent rectangular border 807, and any other constraints considered important by the designer of the graphic 800.

FIG. 9 illustrates application of the scaling process disclosed above with respect to FIG. 5 to the graphic 800 of FIG. 8 to downscale the graphic 800 based on a non-integer scaling factor of 1:33:1. Such scaling might be preformed to scale a graphic created at XHDPI resolution to a graphic displayed at HDPI resolution, or to scale a graphic created at MDPI resolution to a graphic displayed at LDPI resolution. The scaling process of the present invention results in a scaled graphic 900 that maintains the constraints contained in the graphics data representation 219 for the original graphic 800. For example, the scaled graphic 900 as displayed on the display screen 216 of the user device 203 includes scaled progressive-height bars 902-906 within a scaled rectangular border with rounded corners 907, where the progressive-height bars 902-906 have one common width and the border's constituent lines 910-913 and interconnecting arcs have another common width. Additionally, the separation between the scaled progressive-height bars 902-906 remains substantially equal to one another and the distances between the outer progressive-height bars 902, 906 and the vertical lines 913, 911 of the scaled border 907 remain substantially equal to one another. Further, the ratio of the distance between the top of the tallest progressive-height bar 806 and the neighboring horizontal line 810 of the border 807 to the distance between the bottoms of the progressive-height bars 802-806 and their neighboring horizontal line 812 of the border 807 is maintained after scaling.

The scaled graphic 900 resulting from the scaling process of the present invention is in sharp contrast to the scaled graphic 111 typically resulting from prior art scaling as illustrated in FIG. 1. Both FIG. 1 and FIG. 9 illustrate scaling of the same graphic 101, 800. However, because prior art scaling does not utilize a graphics data representation 219, 229 as described above, various features of the scaled graphic 111 are not maintained after scaling, resulting in a lower quality image. For example, the widths and distances between the progressive-height bars 115-119 are different, and the width of the border 113 is in consistent between the border's lines and arcs. Other differences may also be present, such as differences in distances between the outer progressive-height bars 115, 119 and the vertical lines of the border 113 and inconsistency between the ratios of the distances between the tops of the tallest progressive-height bars 109, 119 and the neighboring horizontal lines of the borders 103, 113 to the distances between the bottoms of the progressive-height bars 105-109, 115-119 and their neighboring horizontal lines of the borders 103, 113.

FIG. 10 provides another exemplary illustration of how a multi-object graphic 1001 for which a graphics data representation 219, 229 is created according to the logic flow 400 of FIG. 4 may be scaled and displayed in accordance with the logic flow 500 of FIG. 5. However, in this example, the graphics data representation 219, 229 for the graphic 1001 includes an exemplary set of feature simplification constraints. In other words, besides including various other constraints, such as line widths and spacing, border width, alignment to pixel or mid-pixel boundaries, and so forth, the set of constraints in the graphics data representation 219, 229 for the graphic 100 of FIG. 10 may include rules for simplifying features and/or objects of the graphic 1001 based on the scaling value. One such set of simplification rules exemplified by the scaling illustrated in FIG. 10 is a set of rules for removing features and control points along one or more of the contours based on the scaling value, then optionally re-spacing the remaining features, contours, and/ or objects to preserve a uniform or other spacing between such components which may be present in the original graphic. The graphic 1001 illustrated in FIG. 10 includes a two digit number (e.g., "95") positioned above a series of evenly spaced, vertical lines (tick marks) 1010-1012, 1014-1021, all of which are positioned within a rectangular border. The tick marks 1010-1012, 1014-1021 are positioned along an interior face of the lower horizontal line of the border. The center tick mark 1011 is taller than the outer tick marks 1010, 1012, which are taller than the remaining tick marks 1014-1021. The graphic 1001 may be used to represent a ruler-type icon for an application, a channel selector on a radio dial, a volume level setting indicator, or for any other purpose.

An additional constraint for the graphics data representation 219, 229 of the ruler graphic 1001 may be that the widths and/or spacings of the tick marks 1010-1012, 1014-1021 must be at least a predetermined number of pixels, all the tick marks 1010-1012, 1014-1021 and spaces have integer widths, and/or the widths of the inter-tick mark spaces are greater than or equal to the widths of the tick marks 1010-1012, 1014-1021. For example, with respect to the exemplary graphic 1001 of FIG. 10, the line widths and spacings may be constrained to no less than four pixels, such that all the tick marks 1010-1012, 1014-1021 have equal widths and all the spaces between the tick marks 1010-1012, 1014-1021 have equal widths (although the widths of the spaces may be different than the widths of the tick marks 1010-1012, 1014-1021). If, for example, the widths and spacings of the tick marks 1010-1012, 1014-1021 in the original graphic 1001 are five pixels, then downscaling the graphic 1001 by one-third (1.33:1) would result in widths and spacings of two and two-thirds pixels per tick mark 1010-1012, 1014-1021 if all of the tick marks 1010-1012, 1014-1021 are maintained in the scaled graphic 1003. Thus, the tick mark width and spacing constraint will not be met. To resolve this problem, the graphics data representation 219, 229 for the ruler graphic 1001 may further provide a set of rules for removing tick marks at intermediate positions within the ruler pattern so that the remaining tick marks may be repositioned in a manner similar to the process described above with respect to FIG. 9 to meet the width and spacing constraint, and thereby preserve inter-tick mark spacing. For example, with respect to scaled graphic 1003, the tick mark simplification constraint may provide that smaller intermediate tick marks 1014, 1018 immediately to the right of taller tick marks 1010-1012 are removed first in the event that scaling results in failure to comply with the tick mark width and spacing constraint. If removal of such tick marks 1014, 1018 does not result in re-adjusted tick mark widths and spacings that meet the minimum width criteria, the next tick marks 1015, 1019 to the right of the taller tick marks 1010-1012 are removed until the criteria is met for the re-adjusted, remaining tick marks. In the 1.33:1 downscaled graphic 1003 illustrated in FIG. 10, such downscaling only required removal of intermediate tick marks 1014, 1018 to meet the tick mark spacing and width criteria.

If, as another example, the widths and spacings of the tick marks 1010-1012, 1014-1021 in the original graphic 1001 are five pixels, then downscaling the graphic 1001 by one-half (2:1) would result in widths and spacings of two and one-half pixels per tick mark 1010-1012, 1014-1021 if all of the tick marks 1010-1012, 1014-1021 are maintained in the scaled graphic 1005. Thus, the tick mark width and spacing constraint will not be met and may require removal of more intermediate tick marks than were removed in the case of 1.33:1 scaling. For instance, as illustrated in FIG. 10, both the first and second tick marks 1014-1015, 1018-1019 to the right of the taller tick marks 1010-1012 may need to be removed in the scaled graphic 1005 in order to comply with the width and spacing constraint. The constraints contained within the graphics data representation 219, 229 for a graphic 1001 are therefore preferably established such that they provide optimal display of the scaled graphic regardless of the scaling factor. In other words, the constraints are preferably established to facilitate both integer and non-integer scaling.

FIG. 11 provides another exemplary illustration of how a multi-object graphic 1101 may be scaled and displayed in accordance with the logic flow 500 of FIG. 5. In this example, the graphic 1101 includes a two digit number (e.g., "95") positioned above a series of evenly spaced, vertical lines (tick marks) 1107, 1109-1118, all of which are positioned within a rectangular border. The tick marks 1107, 1109-1118 are positioned along an interior face of the lower horizontal line of the border. The center tick mark 1107 is tallest and the remaining tick marks 1109-1118 alternate between shorter and taller as the tick marks 1109-1118 extend outward from the center tick mark 1107. The graphic 1101 may be used to represent an alternative ruler-type icon for an application, alternative channel selector on a radio dial, alternative volume level setting indicator or for any other purpose.

Similar to the discussion above with respect to FIG. 10, a constraint for the graphics data representation 219, 229 of the alternative ruler graphic 1101 may be that the widths and/or spacings of the tick marks 1107, 1109-1118 must be at least a predetermined number of pixels. For example, the line widths and spacings may be constrained to no less than twelve pixels. If, for example, the widths and spacings of the tick marks 1107, 1109-1118 in the original graphic 1101 are fifteen pixels, then downscaling the graphic 1101 by one-third (1.33:1) would result in widths and spacings of ten pixels per tick mark 1107, 1109-1118 if all of the tick marks 1107, 1109-1118 are maintained in the scaled graphic 1103. Thus, the tick mark width and spacing constraint will not be met. To resolve the problem in this embodiment, the graphics data representation 219, 229 for the alternative ruler graphic 1101 may include a slightly different set of rules than the rules described above with regard to FIG. 10 for removing features and control points along one or more of the contours based on the scaling value. For instance, in this case, the width and spacing constraint may provide a set of rules for removing tick marks at the end positions of the ruler pattern so that the remaining tick marks meet the width and spacing constraint. For example, with respect to scaled graphic 1103, the tick mark simplification constraint may provide that the outermost pair of tick marks 1109, 1118 are removed first in the event that scaling results in failure to comply with the tick mark width and spacing constraint. If removal of such tick marks 1109, 1118 does not result in tick mark widths and spacings that meet the minimum width criteria, the next outermost pair of tick marks 1110, 1117 are removed and, if necessary, successive pairs of outermost tick marks are removed until the criteria is met. In the 1.33:1 downscaled graphic 1103 illustrated in FIG. 11, such downscaling only required removal of the outermost pair of tick marks 1109, 1118 to meet the tick mark spacing and width criteria.

If, as another example, the widths and spacings of the tick marks 1107, 1109-1118 in the original graphic 1101 are twelve pixels, then downscaling the graphic 1101 by one-half (2:1) would result in widths and spacings of six pixels per tick mark 1107, 1109-1118 if all of the tick marks 1107, 1109-1118 are maintained in the scaled graphic 1105. Thus, the tick mark width and spacing constraint will not be met and may require removal of more tick marks than were removed in the case of 1.33:1 scaling. For instance, as illustrated in FIG. 11, the four outermost tick marks 1109-1110, 1117-1118 may need to be removed in the scaled graphic 1105 in order to comply with the width and spacing constraint. The constraints contained within the graphics data representation 219, 229 for the alternative rule graphic 1101 are preferably established such that they provide optimal display of the scaled graphic regardless of the scaling factor.

In an alternative embodiment, the constraints contained in the graphics data representation 219, 229 may include additional rules for collapsing a feature dimension (e.g., line width, line length, or any other feature) to zero when the feature dimension is to be adjusted to be less than a threshold quantity of pixels based on the scaling value. For example, with regard to the graphic 1101 of FIG. 11, including such a constraint in the graphics data representation 219, 229 for the graphic 1101 may cause the rectangular border to be collapsed to zero (i.e., removed or eliminated) if the width of the border is reduced to less than the threshold quantity pixels as a result of scaling to the required scaling value.

Those of ordinary skill in the art will recognize and appreciate that the simplification constraint examples described above with respect to FIGS. 10 and 11 are merely exemplary and that similar or analogous simplifications constraints may be incorporated into graphics data representations of various other graphics if such constraints are considered to be needed in order to maintain high quality displays of the graphics when scaled to the resolutions of the particular display screens. Those of ordinary skill in the art will also recognize and appreciate that there are a myriad of possible patterns of simplification that can be applied in accordance with the present invention based on the nature of the particular graphic and the desires of the graphic designer. That is, the designer may create a progressive series of thresholds based upon which additional detail of the graphic can be removed, with the optional ability to re-space remaining items of the graphic to preserve symmetry or uniformity in the design.

The present invention encompasses a method and apparatus for creating a graphics data representation and scaling a graphic represented thereby for display on a display screen. With this invention, a single unique representation is created for each desired graphic, which representation includes appropriate constraints to permit the graphic to be properly scaled to any desired display resolution. As a result, the single graphics data representation can replace the multiple individual bitmap versions of a graphic typically created for multiple possible display resolutions, thereby saving significant storage space in memory of the displaying device. The present invention has particular benefit in electronic devices with smaller amounts of memory (e.g., portable devices, such as cell phones, smartphones, portable media players, handheld gaming device, and so forth), although the scaling features may be used in any display-capable electronic device and the graphics data representation creation features may be used in any electronic device that is used for creating graphics files.

As detailed above, embodiments of the present invention reside primarily in combinations of method steps and/or apparatus components related to creating a graphics data representation and scaling a graphic represented thereby for display on a display screen. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual relationship or order between such entities or actions. The terms "comprises," "comprising," "includes," "including," "has," "having," "contains," "containing," and any other variations thereof are intended to cover a non-exclusive inclusion, such that a process, method, article, or apparatus that comprises, includes, has, or contains a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the electronic devices 203, 205 described herein may be comprised of one or more conventional processors and unique stored program instructions that control the processor(s) to implement, in conjunction with certain non-processor circuits, some, most, or all of the functions of the electronic devices 203, 205 and their operational methods as described herein. The non-processor circuits may include, but are not limited to, storage devices (such as internal memory 214, 224), audio input devices, the display screen 216, user interfaces, audio output devices, and wired or wireless transceivers that may be incorporated into the network interfaces 210, 220, as well as filters, clock circuits, and various other non-processor circuits. As such, the functions of these non-processor circuits may be interpreted as forming part of processing steps in various embodiments of the present invention. Alternatively, some or all functions described above as being executed by a processor 212, 222 may be handled by multiple processors in a distributed or parallel manner. Further, some or all of the functions could be implemented by a state machine that has no stored program instructions, or in one or more application specific integrated circuits (ASICs), in which each function or some combinations of certain of the functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the appended claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

What is claimed is:

1. A method for creating a graphics data representation for a graphic that includes a plurality of objects separated by one or more predefined spatial relationships, the graphics data representation facilitating scaling of the graphic from a first resolution at which the graphic was created to a second resolution at which the graphic is to be displayed, the method comprising:

determining a plurality of constraints to be imposed upon features of a plurality of contours of the plurality of objects and control points of the plurality of contours during scaling of the graphic, the plurality of constraints including spatial relationships between control points of two or more contours constituting at least part of two or more spaced apart objects;

establishing at least one priority among the plurality of constraints, the at least one priority including favoring an imposition of a first constraint of the plurality of constraints over an imposition of a second constraint of the plurality of constraints; and storing the plurality of constraints, the at least one priority, identifications of the features and the control points, descriptions of the plurality of contours, and information identifying the first resolution as a graphics data representation in a format understandable by a processor of an electronic device.

2. The method of claim 1, further comprising:
incorporating the graphics data representation into an application executable by one or more processors of the electronic device.

3. The method of claim 1, further comprising:
communicating the graphics data representation to the electronic device over a network.

4. The method of claim 1, wherein the first resolution and the second resolution have a non-integer relationship.

5. The method of claim 1, wherein the second resolution is lower than the first resolution.

6. The method of claim 1, wherein the features include one or more of: horizontal faces of lines, vertical faces of lines, angled faces of lines, parallel faces of lines, horizontal and vertical extremes of curves, inflection points of curves, junctions of lines and curves, junctions of lines of differing slopes, junctions of successive curves, centers of circles, centers of isolatable fragments of the plurality of contours, or center points of the plurality of contours.

7. The method of claim 1, wherein the plurality of constraints include rules for at least one of:
aligning at least some of the features and the control points to full pixel boundaries of a display, mid-pixel boundaries of the display, or particular distances between full pixel boundaries of the display;
aligning at least some of the features so as to be particular distances from other features;
aligning at least some of the control points so as to be particular distances from other control points;
maintaining desired thicknesses of lines used to create one or more of the features;
maintaining a desired overall width of the graphic;
maintaining a desired midpoint between any two of the control points; or
maintaining a desired midpoint between any two of the features.

8. The method of claim 1, wherein the plurality of constraints include intra-contour constraints and inter-contour constraints.

9. The method of claim 1, wherein the plurality of constraints include rules for simplifying the features and the plurality of objects based on a scaling value, wherein the scaling value is determinable from the first resolution and the second resolution.

10. The method of claim 9, wherein the rules for simplifying the features and the plurality of objects based on the scaling value include rules for collapsing a feature dimension to zero when the feature dimension must be adjusted to be less than a threshold quantity of pixels based on the scaling value.

11. The method of claim 9, wherein the rules for simplifying the features and the plurality of objects based on the scaling value include rules for removing features and control points along one or more of the plurality of contours based on the scaling value.

12. The method of claim 1, wherein two or more of the plurality of constraints apply to a single control point.

13. The method of claim 1, wherein the plurality of contours include at least one Bezier curve, the method further comprising:
determining secondary points offset from the at least one Bezier curve, the secondary points providing additional reference positions to define the at least one Bezier curve;
wherein the graphics data representation further includes identifications of the secondary points.

14. The method of claim 1, further comprising:
decomposing the plurality of objects into the plurality of contours; and
determining the features and the control points along the plurality of contours.

15. A method for a processor of an electronic device to scale a graphic for display on a display screen of the electronic device, the graphic including a plurality of objects separated by one or more predefined spatial relationships and being represented by a graphics data representation, the graphics data representation including information identifying a first resolution at which the graphic was created, a plurality of constraints for imposition upon features of a plurality of contours of the plurality of objects and control points of the plurality of contours during scaling of the plurality of contours, the plurality of constraints including spatial relationships between control points of two or more contours constituting at least part of two or more spaced apart objects, and at least one priority among the plurality of constraints, the at least one priority including favoring an imposition of a first constraint of the plurality of constraints over an imposition of a second constraint of the plurality of constraints, the method comprising:
determining a scaling value based on a relationship between the first resolution and a second resolution at which the graphic is to be displayed;
adjusting the features and the control points of the plurality of contours based on the scaling value and the plurality of constraints in the graphics data representation to produce a scaled representation of the graphic; and
displaying the scaled representation of the graphic on the display screen of the electronic device at the second resolution.

16. The method of claim 15, further comprising:
receiving the graphics data representation over a network prior to determining the scaling value.

17. The method of claim 15, wherein the graphics data representation is included in an application, the method further comprising:
executing the application to retrieve the graphics data representation.

18. The method of claim 15, wherein the first resolution and the second resolution have a non-integer relationship.

19. The method of claim 15, wherein the plurality of constraints include rules for at least one of:
aligning at least some of the features and the control points to full pixel boundaries of the display, mid-pixel boundaries of the display, or particular distances between full pixel boundaries of the display;
aligning at least some of the features so as to be particular distances from other features;
aligning at least some of the control points so as to be particular distances from other control points;
maintaining desired thicknesses of lines used to create one or more of the features;
maintaining a desired overall width of the graphic;

maintaining a desired midpoint between any two of the control points; or maintaining a desired midpoint between any two of the features.

20. The method of claim 15, wherein the plurality of constraints include rules for simplifying the features and the plurality of objects based on the scaling value.

21. The method of claim 20, wherein the rules for simplifying the features and the plurality of objects based on the scaling value include rules for collapsing a feature dimension to zero when the feature dimension must be adjusted to be less than a threshold quantity of pixels based on the scaling value.

22. The method of claim 20, wherein the rules for simplifying the features and the plurality of objects based on the scaling value include rules for removing features and control points along one or more of the plurality of contours based on the scaling value.

23. The method of claim 15, wherein the plurality of contours include at least one Bezier curve, wherein the graphics data representation further includes identifications of secondary points offset from the at least one Bezier curve, the secondary points providing additional reference positions to define the at least one Bezier curve, and wherein the step of adjusting further comprises:

adjusting the secondary points based on adjustments made to control points for the at least one Bezier curve.

24. The method of claim 15, wherein the graphics data representation further includes:

descriptions of the plurality of contours defining the plurality of objects of the graphic; and identifications of the features and the control points along the plurality of contours.

25. An electronic device comprising:

a display screen operable to display graphics at a first resolution;

a memory operable to store a graphics data representation for a graphic that includes a plurality of objects separated by one or more predefined spatial relationships, the graphics data representation including information identifying a second resolution at which the graphic was created, a plurality of constraints for imposition upon features of a plurality of contours of the plurality of objects and control points of the plurality of contours during scaling of the plurality of contours from the second resolution to the first resolution, the plurality of constraints including spatial relationships between control points of two or more contours constituting at least part of two or more spaced apart objects, and at least one priority among the plurality of constraints, the at least one priority including favoring an imposition of a first constraint of the plurality of constraints over an imposition of a second constraint of the plurality of constraints; and a processor coupled to the display and the memory, the processor being operable to:

determine a scaling value based upon a relationship between the first resolution and the second resolution;

adjust the features and the control points of the plurality of contours based on the scaling value and the plurality of constraints in the graphics data representation to produce a scaled representation of the graphic; and display the scaled representation of the graphic on the display screen at the first resolution.

26. The electronic device of claim 25, further comprising:

a communication network interface coupled to the processor, the communication network interface operable to receive the graphics data representation over a network, wherein the processor is further operable to store the graphics data representation in the memory responsive to receipt of the graphics data representation by the communication network interface.

27. The electronic device of claim 25, wherein the graphics data representation is included in an application stored in the memory, and wherein the processor is further operable to:

execute the application to retrieve the graphics data representation.

28. The electronic device of claim 25, wherein the plurality of constraints include rules for simplifying the features and the plurality of objects based on the scaling value, and wherein the rules for simplifying the features and the plurality of objects include:

rules for collapsing a feature dimension to zero when the feature dimension must be adjusted to be less than a threshold quantity of pixels based on the scaling value; and rules for removing features and control points along one or more of the plurality of contours based on the scaling value.

29. The electronic device of claim 25, wherein the plurality of contours include at least one Bezier curve, wherein the graphics data representation further includes identifications of secondary points offset from the at least one Bezier curve, the secondary points providing additional reference positions to define the at least one Bezier curve, and wherein the processor is further operable to:

adjust the secondary points based on adjustments made to control points for the at least one Bezier curve.

30. The electronic device of claim 25, wherein the processor is further operable to:

decompose the plurality of objects into the plurality of contours;

determine the features and the control points along the plurality of contours;

determine the plurality of constraints to be imposed upon the features and the control points during scaling;

establish at least one priority among the plurality of constraints, the at least one priority including favoring an imposition of a first constraint of the plurality of constraints over an imposition of a second constraint of the plurality of constraints; and store the plurality of constraints, the at least one priority, the identifications of the features and the control points, the descriptions of the plurality of contours, and information identifying the second resolution in the memory as the graphics data representation.

31. The electronic device of claim 25, wherein the first resolution and the second resolution have a non-integer relationship.

32. The electronic device of claim 25, wherein the graphics data representation further includes:

descriptions of the plurality of contours defining the plurality of objects of the graphic; and identifications of the features and the control points along the plurality of contours.

* * * * *